United States Patent
Liu et al.

(10) Patent No.: US 11,490,110 B2
(45) Date of Patent: Nov. 1, 2022

(54) DECODER SIDE MOTION VECTOR DERIVATION

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/405,179

(22) Filed: Aug. 18, 2021

(65) Prior Publication Data

US 2021/0385481 A1 Dec. 9, 2021

Related U.S. Application Data

(63) Continuation of application No. PCT/CN2020/082937, filed on Apr. 2, 2020.

(30) Foreign Application Priority Data

Apr. 2, 2019 (WO) ................. PCT/CN2019/081155
May 7, 2019 (WO) ................. PCT/CN2019/085796

(51) Int. Cl.
*H04N 19/105* (2014.01)
*H04N 19/513* (2014.01)
(Continued)

(52) U.S. Cl.
CPC ......... *H04N 19/513* (2014.11); *H04N 19/105* (2014.11); *H04N 19/132* (2014.11); *H04N 19/176* (2014.11)

(58) Field of Classification Search
None
See application file for complete search history.

(56) References Cited

U.S. PATENT DOCUMENTS 6,480,615 B1   11/2002   Sun et al.
7,627,037 B2   12/2009   Li et al.
(Continued)

FOREIGN PATENT DOCUMENTS

CN   103155563 A   6/2013
CN   103765897 A   4/2014
(Continued)

OTHER PUBLICATIONS

Blaser et al. "Geometry-based Partitioning for Predictive Video Coding with Transform Adaptation," 2018, IEEE.
(Continued)

*Primary Examiner* — Christopher G Findley
(74) *Attorney, Agent, or Firm* — Perkins Coie LLP

(57) ABSTRACT

A method for processing a video includes performing a conversion between a current block of visual media data and a corresponding coded representation of the visual media data, wherein the conversion of the current block includes determining whether a use of one or both of a bi-directional optical flow (BIO) technique or a decoder-side motion vector refinement (DMVR) technique to the current block is enabled or disabled, and wherein the determining the use of the BIO technique or the DMVR technique is based on a cost criterion associated with the current block.

20 Claims, 27 Drawing Sheets

(51) Int. Cl.
*H04N 19/176* (2014.01)
*H04N 19/132* (2014.01)

(56) References Cited

U.S. PATENT DOCUMENTS

| | | | |
|---|---|---|---|
| 9,215,470 B2 | 12/2015 | Karczewicz et al. | |
| 9,247,246 B2 | 1/2016 | Liu et al. | |
| 9,294,777 B2 | 3/2016 | Wang | |
| 9,445,103 B2 | 9/2016 | Xu et al. | |
| 9,509,995 B2 | 11/2016 | Xu et al. | |
| 9,521,425 B2 | 12/2016 | Chen et al. | |
| 9,554,150 B2 | 1/2017 | Zhang et al. | |
| 9,596,448 B2 | 3/2017 | Thirumalai et al. | |
| 9,628,795 B2 | 4/2017 | Zhang et al. | |
| 9,641,852 B2 | 5/2017 | Lu et al. | |
| 9,654,792 B2 | 5/2017 | Chiu et al. | |
| 9,667,996 B2 | 5/2017 | Chen et al. | |
| 9,756,336 B2 | 9/2017 | Zhang et al. | |
| 9,762,927 B2 | 9/2017 | Chen et al. | |
| 9,906,813 B2 | 2/2018 | Zhang et al. | |
| 9,955,186 B2 | 4/2018 | Chon et al. | |
| 10,009,615 B2 | 6/2018 | Gisquet et al. | |
| 10,165,252 B2 | 12/2018 | An et al. | |
| 10,230,980 B2 | 3/2019 | Liu et al. | |
| 10,244,253 B2 | 3/2019 | Chen et al. | |
| 10,257,539 B2 | 4/2019 | An et al. | |
| 10,268,901 B2 * | 4/2019 | Garud | G06K 9/00791 |
| 10,271,048 B2 | 4/2019 | Zhang et al. | |
| 10,334,281 B2 | 6/2019 | Zhang et al. | |
| 10,341,677 B2 | 7/2019 | Sung et al. | |
| 10,390,044 B2 | 8/2019 | Karczewicz et al. | |
| 10,523,964 B2 | 12/2019 | Chuang et al. | |
| 10,587,859 B2 | 3/2020 | An et al. | |
| 10,609,423 B2 | 3/2020 | Chuang et al. | |
| 10,645,382 B2 | 5/2020 | Zhang et al. | |
| 10,687,069 B2 | 6/2020 | Li et al. | |
| 10,701,366 B2 | 6/2020 | Chen et al. | |
| 10,764,592 B2 | 9/2020 | Zhang et al. | |
| 10,779,002 B2 | 9/2020 | Chen et al. | |
| 10,785,494 B2 | 9/2020 | Chien et al. | |
| 10,805,630 B2 | 10/2020 | Li et al. | |
| 10,805,650 B2 | 10/2020 | Wang et al. | |
| 10,812,806 B2 | 10/2020 | Zhang et al. | |
| 10,887,597 B2 | 1/2021 | Liu et al. | |
| 10,904,565 B2 | 1/2021 | Chuang et al. | |
| 10,939,130 B2 | 3/2021 | Xiu et al. | |
| 10,986,360 B2 | 4/2021 | Thirumalai et al. | |
| 2007/0188607 A1 | 8/2007 | Jia et al. | |
| 2011/0176611 A1 | 7/2011 | Huang et al. | |
| 2012/0163711 A1 | 6/2012 | Nagone | |
| 2013/0202037 A1 | 8/2013 | Wang et al. | |
| 2014/0177706 A1 | 6/2014 | Fernandes et al. | |
| 2014/0286408 A1 | 9/2014 | Zhang et al. | |
| 2015/0181216 A1 | 6/2015 | Zhang et al. | |
| 2015/0229926 A1 | 8/2015 | Puri | |
| 2015/0264406 A1 | 9/2015 | Kim et al. | |
| 2015/0365649 A1 | 12/2015 | Chen et al. | |
| 2016/0286229 A1 | 9/2016 | Li et al. | |
| 2016/0286232 A1 | 9/2016 | Li et al. | |
| 2016/0345011 A1 | 11/2016 | Naing et al. | |
| 2017/0094305 A1 | 3/2017 | Li et al. | |
| 2017/0238020 A1 | 8/2017 | Karczewicz et al. | |
| 2017/0339405 A1 | 11/2017 | Wang et al. | |
| 2018/0098097 A1 | 4/2018 | Huang et al. | |
| 2018/0176582 A1 | 6/2018 | Zhao et al. | |
| 2018/0176587 A1 | 6/2018 | Panusopone et al. | |
| 2018/0192072 A1 | 7/2018 | Chen et al. | |
| 2018/0199057 A1 | 7/2018 | Chuang et al. | |
| 2018/0241998 A1 | 8/2018 | Chen et al. | |
| 2018/0262773 A1 | 9/2018 | Chuang et al. | |
| 2018/0278949 A1 | 9/2018 | Karczewicz et al. | |
| 2018/0278950 A1 | 9/2018 | Chen et al. | |
| 2018/0352226 A1 | 12/2018 | An et al. | |
| 2018/0376166 A1 | 12/2018 | Chuang et al. | |
| 2019/0191180 A1 | 6/2019 | An et al. | |
| 2019/0222848 A1 | 7/2019 | Chen et al. | |
| 2019/0222865 A1 | 7/2019 | Zhang et al. | |
| 2019/0238883 A1 | 8/2019 | Chen et al. | |
| 2019/0306502 A1 | 10/2019 | Gadde et al. | |
| 2019/0320197 A1 | 10/2019 | Chen et al. | |
| 2019/0320199 A1 | 10/2019 | Chen et al. | |
| 2019/0387234 A1 | 12/2019 | Wang et al. | |
| 2020/0021833 A1 | 1/2020 | Xu et al. | |
| 2020/0045336 A1 | 2/2020 | Xiu et al. | |
| 2020/0068218 A1 | 2/2020 | Chen et al. | |
| 2020/0077086 A1 | 3/2020 | Lee | |
| 2020/0092545 A1 | 3/2020 | Xu et al. | |
| 2020/0128258 A1 | 4/2020 | Chen et al. | |
| 2020/0137416 A1 | 4/2020 | Esenlik et al. | |
| 2020/0221110 A1 | 7/2020 | Chien et al. | |
| 2020/0221122 A1 | 7/2020 | Ye et al. | |
| 2020/0260070 A1 | 8/2020 | Yoo et al. | |
| 2020/0296414 A1 | 9/2020 | Park et al. | |
| 2020/0336738 A1 | 10/2020 | Xiu et al. | |
| 2020/0344475 A1 | 10/2020 | Zhu et al. | |
| 2020/0359024 A1 | 11/2020 | Misra et al. | |
| 2020/0366902 A1 | 11/2020 | Jeong et al. | |
| 2020/0374543 A1 | 11/2020 | Liu et al. | |
| 2020/0382795 A1 | 12/2020 | Zhang et al. | |
| 2020/0382807 A1 | 12/2020 | Liu et al. | |
| 2020/0396453 A1 | 12/2020 | Zhang et al. | |
| 2020/0413082 A1 * | 12/2020 | Li | H04N 19/159 |
| 2021/0006790 A1 | 1/2021 | Zhang et al. | |
| 2021/0006803 A1 | 1/2021 | Zhang et al. | |
| 2021/0029356 A1 | 1/2021 | Zhang et al. | |
| 2021/0029362 A1 | 1/2021 | Liu et al. | |
| 2021/0029366 A1 | 1/2021 | Zhang et al. | |
| 2021/0029368 A1 | 1/2021 | Zhang et al. | |
| 2021/0029370 A1 * | 1/2021 | Li | H04N 19/50 |
| 2021/0029372 A1 | 1/2021 | Zhang et al. | |
| 2021/0037256 A1 | 2/2021 | Zhang et al. | |
| 2021/0051339 A1 | 2/2021 | Liu et al. | |
| 2021/0051348 A1 | 2/2021 | Zhang et al. | |
| 2021/0051349 A1 | 2/2021 | Zhang et al. | |
| 2021/0058618 A1 | 2/2021 | Zhang et al. | |
| 2021/0058637 A1 | 2/2021 | Zhang et al. | |
| 2021/0058647 A1 | 2/2021 | Zhang et al. | |
| 2021/0076050 A1 | 3/2021 | Zhang et al. | |
| 2021/0076063 A1 | 3/2021 | Liu et al. | |
| 2021/0092378 A1 | 3/2021 | Zhang et al. | |
| 2021/0092431 A1 | 3/2021 | Zhang et al. | |
| 2021/0092435 A1 | 3/2021 | Liu et al. | |
| 2021/0112248 A1 | 4/2021 | Zhang et al. | |
| 2021/0120243 A1 | 4/2021 | Zhang et al. | |
| 2021/0144400 A1 | 5/2021 | Liu et al. | |
| 2021/0168357 A1 * | 6/2021 | Toma | H04N 19/577 |
| 2021/0227245 A1 | 7/2021 | Liu et al. | |
| 2021/0227246 A1 | 7/2021 | Liu et al. | |
| 2021/0227250 A1 | 7/2021 | Liu et al. | |
| 2021/0235083 A1 | 7/2021 | Liu et al. | |
| 2021/0266530 A1 | 8/2021 | Liu et al. | |
| 2021/0266585 A1 | 8/2021 | Liu et al. | |
| 2021/0274205 A1 | 9/2021 | Park et al. | |
| 2021/0274213 A1 | 9/2021 | Xiu et al. | |
| 2021/0281865 A1 | 9/2021 | Liu et al. | |
| 2021/0314586 A1 * | 10/2021 | Li | H04N 19/105 |
| 2021/0329257 A1 * | 10/2021 | Sethuraman | H04N 19/513 |
| 2021/0344952 A1 * | 11/2021 | Xiu | H04N 19/176 |
| 2021/0368172 A1 | 11/2021 | Lim et al. | |
| 2021/0377553 A1 | 12/2021 | Galpin et al. | |

FOREIGN PATENT DOCUMENTS

| | | |
|---|---|---|
| CN | 105723454 A | 6/2016 |
| CN | 107005713 A | 8/2017 |
| CN | 107925775 A | 4/2018 |
| CN | 108352074 A | 7/2018 |
| CN | 108541375 A | 9/2018 |
| CN | 108781294 A | 11/2018 |
| CN | 109191514 A | 1/2019 |
| CN | 110267045 A | 9/2019 |
| CN | 111010569 A | 4/2020 |
| EP | 2800368 A1 | 11/2014 |
| EP | 3657794 A1 | 5/2020 |

(56) References Cited

FOREIGN PATENT DOCUMENTS

| | | |
|---|---|---|
| WO | 2016160609 A1 | 10/2016 |
| WO | 2017133661 A1 | 8/2017 |
| WO | 2018028559 A1 | 2/2018 |
| WO | 2018113658 A1 | 6/2018 |
| WO | 2018119233 A1 | 6/2018 |
| WO | 2018121506 A1 | 7/2018 |
| WO | 2018128417 A1 | 7/2018 |
| WO | 2018129172 A1 | 7/2018 |
| WO | 2018156628 A1 | 8/2018 |
| WO | 2018171796 A1 | 9/2018 |
| WO | 2018166357 A1 | 9/2019 |
| WO | 2020186119 A1 | 9/2020 |

OTHER PUBLICATIONS

Chen et al. "CE9.5.2: Bio with Simplified Gradient Calculation, Adaptive BIO Granularity, and Applying BIO to Chroma Components," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0255, 2018.

Chen et al. "CE9-Related: Simplified DMVR with Reduced Internal Memory," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0098, 2018.

Chuang et al. "EE2-Related: A Simplified Gradient Filter for Bi-Directional Optical Flow (BIO)," Joint Video Exploration Team (JVET) of ITU-T SG 16 WP 3 and ISO/IEC JTC 1/SC 29/WG 11, 7th Meeting, Torino, IT, Jul. 13-21, 2017, document G0083, 2017.

Esenlik et al. "Description of Core Experiment 9 (CE9): Decoder Side Motion Vector Derivation," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J1029, 2018.

Hsu et al. "Description of Core Experiment 10: Combined and Multi-Hypothesis Prediciton," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J1030, 2018.

ITU-T H.265 ""High efficiency video coding"" Series H: Audiovisual and Multimedia SYSTEMSInfrastructure of audiovisual services—Coding of movingvideo,Telecommunicationstandardization Sectorof ITU, Available at address: https://www.itu.int/rec/T-REC-H.265 (Nov. 2019).

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ulitmate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Kamp et al. "Decoder Side Motion Vector Derivation for Inter Frame Video Coding," 2008, IEEE, RWTH Aachen University, Germany.

Kamp et al. "Fast Decoder Side Motion Vector Derivation for Inter Frame Video Coding," 2009, RWTH Aachen University, Germany.

Klomp et al. "Decoder-Side Block Motion Estimation for H.264 / MPEG-4 AVC Based Video Coding," 2009, IEEE, Hannover, Germany, pp. 1641-1644.

Li et al. "CE4-Related: Affine Merge Mode with Prediction Offsets," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0320, 2018.

Liu et al. "CE9-Related: Motion Vector Refinement in Bi-Directional Optical Flow," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0333, 2018.

Murakami et al., "Advanced B Skip Mode with Decoder-side Motion Estimation," HITACHI, 2012, 37th VCEG Meeting at Yokohama, VCEG-AK12.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.

Ueda et al. "TE1.a: Implementation Report of Refinement Motion Compensation Using DMVD on TMuC," Joint Collaborative Team on Video Coding (JCT-VC) of ITU-T SG16 WP3 and ISO/IEC JTC1/SC29/WG11, 3rd Meeting, Guangzhou, CN, Oct. 7-15, 2010, document JCTVC-C138, 2010.

Winken et al. "CE10:Multi-Hypothesis Inter Prediction (Tests 1.5-1.8)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0269, 2018.

Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0256, 2018.

Zhang et al. "CE4-Related: Interweaved Prediction for Affine Motion Compensation," Joint Video Experts Team (JVET) of ITU-T SG 16 WP3 and ISO/IEC JTC 1/SC 29/WG 11, 11th Meeting, Ljubljana, SI, Jul. 10-18, 2018, document JVET-K0102, 2018.

Partial Supplementary European Search Report from European Patent Application No. 19887639.3 dated Oct. 27, 2021.

International Search Report and Written Opinion from International Patent Application No. PCT/CN2019/119634 dated Feb. 26, 2020 (11 pages).

International Search Report and Written Opinion from International Patent Application No. PCT/IB2019/058994 dated Jan. 2, 2020 (16 pages).

International Search Report and Written Opinion from International Patent Application No. PCT/IB2019/058995 dated Jan. 17, 2020 (16 pages).

International Search Report and Written Opinion from International Patent Application No. PCT/IB2019/058996 dated Jan. 2, 2020 (15 pages).

International Search Report and Written Opinion from International Patent Application No. PCT/IB2019/058997 dated Jan. 16, 2020 (18 pages).

Non-Final Office Action from U.S. Appl. No. 17/154,485 dated Mar. 23, 2021.

Final Office Action from U.S. Appl. No. 17/154,485 dated Jul. 27, 2021.

Non-Final Office Action from U.S. Appl. No. 17/225,470 dated Nov. 26, 2021.

Akula et al. "Description of SDR, HDR and 360 degrees Video Coding Technology Proposal Considering Mobile Application Scenario by Samsung, Huawei, GoPro, and HiSilicon," buJoint Video Exploration Team (JVET) of ITU-T SG 16 WP 3 and ISO/IEC JTC 1/SC 29/WG 11, 10th Meeting, San Diego, US, Apr. 10-20, 2018, document JVET-J0024, 2018.

Alshin et al. "Bi-Directional Optical Flow for Improving Motion Compensation," Dec. 8-10, 2010, 28th Picture Coding Symposium, PCS2010, Nagoya, Japan, pp. 422-425.

Alshin et al. "AHG6: On BIO Memory Bandwidth," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0042, 2016.

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

(56) References Cited

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.

Chen et al. "Algorithm Description of Joint Exploration Test Model 7 (JEM 7)," Joint Video Exploration Team (JVET) of ITU-T SG WP 3 and ISO/IEC JTC 1/SC 29/WG 11, 7th Meeting, Torino, IT, Jul. 13-21, 2017, document JVET-G1001, 2017.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Esenlik et al. "CE9: DMVR with Bilateral Matching (Test2.9)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0217, 2018.

Esenlik et al. "CE9: Report on the Results of Tests CE9.2.15 and CE9.2.16," Joint Video Experts Team (JVET) of ITU-T SG 16 WP 3 and ISO/IEC JTC 1/SC 29/WG 11, 12th Meeting, Macao, CN, Oct. 3-12, 2018, docu,emt JVET-L0163, 2018.

JEM-7.0: https://jvet.hhi.fraunhofer.de/svn/svn_HMJEMSoftware/tags/HM-16.6-JEM-7.0.

https://vcgit.hhi.fraunhofer.de/jvet/VVCSoftware_VTM/tags/VTM-2.1.

"ITU-T H.265 ""High efficiency video coding"" Series H: Audiovisual and Multimedia SystemsInfrastructure of audiovisual services—Coding of movingvideo,Telecommunicationstandardization Sectorof ITU, (Feb. 2018)."

Lai et al. "CE9-Related: BIO Simplification," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0099, 2018.

Liu et al. "CE9-Related: Simplification of Decoder Side Motion Vector Derivation," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0105, 2018.

Luo et al. "CE9.2.7: Complexity Reduction on Decoder-Side Motion Vector Refinement (DMVR)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0196, 2018.

Xiu et al. "CE9.5.3: Bi-Directional Optical Flow (BIO) Simplification," Joint Video Experts Team (JVET) of ITU-T SG 16 WP 3 and ISO/IEC JTC 1/SC 29/WG 11, 11th, Meeting, Ljubljana, SI, Jul. 10-18, 2018, document JVET-K0344, 2018.

International Search Report and Written Opinion from International Patent Application No. PCT/CN2019/119742 dated Feb. 19, 2020 (12 pages).

International Search Report and Written Opinion from International Patent Application No. PCT/CN2019/119756 dated Feb. 7, 2020 (10 pages).

International Search Report and Written Opinion from International Patent Application No. PCT/CN2019/119763 dated Feb. 26, 2020 (12 pages).

International Search Report and Written Opinion from International Patent Application No. PCT/CN2020/082937 dated Jun. 30, 2020 (10 pages).

International Search Report and Written Opinion from International Patent Application No. PCT/CN2020/088927 dated Aug. 12, 2020 (9 pages).

Non-Final Office Action from U.S. Appl. No. 17/244,633 dated Jan. 6, 2022.

Non-Final Office Action from U.S. Appl. No. 17/225,504 dated Jan. 19, 2022.

Non-Final Office Action for U.S. Appl. No. 17/317,522 dated Mar. 1, 2022.

Bross et al., "Versatile Video Coding (Draft 7), " Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2016.

Esenlik et al. "BoG Report on PROF/BDOF Harmonization Contributions (CE4&CE9 related)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1133, 2019.

Liu et al., "Non-CE9: Unified Gradient Calculations in BDOF," Joint Video Experts Team (JVET) of ITU-T SG 16 WP 3 an ISO/IEC JTC 1/SC 29/WG 11 15th Meeting: Gothenburg, SE, Jul. 3-12, 2019, document JVET-O0570, 2019.

Park et al., "Non-CE9: Mismatch Between Text Specification and Reference Software on BDOF and DMVR," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0444, 2016.

Sethuraman et al. "Non-CE9: Methods for BDOF Complexity Reduction,", Joint Video Expert Team (JVET) of ITU-T SG 16 WP 3 and ISO/IEC JTC 1/SC 29/WG 11 13th Meeting: Marrakech, MA, Jan. 9-18, 2019, document JVET-M0517, 2019.

Extended European Search Report from European Patent Application No. 20782973.0 dated Mar. 7, 2022.

Toma et al. "Description of SDR Video Coding Technology Proposal by Panasonic," Joint Video Experts Team (JVET) of ITU-T SG 16 WP 3 and ISO/IEC JTC 1/SC 29/WG 11 10th Meeting, San Diego, US, Apr. 10-20, 2018, document JVET-J0020, 2018. (cited in EP19887639.3 EESR mailed Mar. 15, 2022).

Xiu et al. "CE10-Related: Simplification on Combined Inter and Intra Prediction (CIIP)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0327, 2019. (cited in JP2021-525770 OA mailed May 10, 2022).

Extended European Search Report from European Patent Application No. 19887639.3 dated Mar. 15, 2022.

Non-Final Office Action from U.S. Appl. No. 17/244,633 dated Apr. 29, 2022.

Non-Final Office Action from U.S. Appl. No. 17/230,004 dated Jun. 14, 2022.

Chujoh et al. "CE9-related: An Early Termination of DMVR," Joint Video Experts Team (JVET of ITU-T SG 16 WP 3 and ISO/IEC JTC 1/SC 29/WG 11 12th Meeting: Macao, CN, Oct. 3-12, 2018. document JVET-L0367, 2018. (cited in CN201980076196.3 OA1 mailed Aug. 8, 2022).

Esenlik et al. "Simplified DMVR for Inclusion in VVC," Joint Experts Team (JVET) of ITU-T SG 16 WP 3 an ISO/IEC JTC 1/SC 29/WG 1 12th Meeting: Macao, CN, Oct. 3-12, 2018, document JVET-L0670, 2018. (cited in CN201980076196.3 OA1 mailed Aug. 8, 2022).

* cited by examiner

2000

2005 performing a conversion between a current block of visual media data and a corresponding coded representation of the visual media data, wherein the conversion of the current block includes determining whether a use of one or both of a bi-directional optical flow (BIO) technique or a decoder-side motion vector refinement (DMVR) technique to the current block is enabled or disabled, and
wherein the determining the use of the BIO technique or the DMVR technique is based on computing that a mean value difference of a pair of reference blocks associated with the current block exceeds a threshold value

FIG. 20

DECODER SIDE MOTION VECTOR DERIVATION

CROSS REFERENCE TO RELATED APPLICATIONS

This application is a continuation of International Patent Application No. PCT/CN2020/082937, filed on Apr. 2, 2020, which claims the priority to and benefits of International Patent Application No. PCT/CN2019/081155, filed on Apr. 2, 2019, and International Patent Application No. PCT/CN2019/085796, filed on May 7, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

In one example aspect, a method of processing video is disclosed. The method includes performing a conversion between a current block of visual media data and a corresponding coded representation of the visual media data, wherein the conversion of the current block includes determining whether a use of one or both of a bi-directional optical flow (BIO) technique or a decoder-side motion vector refinement (DMVR) technique to the current block is enabled or disabled, and wherein the determining the use of the BIO technique or the DMVR technique is based on a cost criterion associated with the current block.

In another example aspect, a method of processing video is disclosed. The method includes performing a conversion between a current block of visual media data and a corresponding coded representation of the visual media data, wherein the conversion of the current block includes determining whether a use of a decoder-side motion vector refinement (DMVR) technique to the current block is enabled or disabled, and wherein the DMVR technique includes refining motion information of the current block based on a cost criterion other than a mean removed sum of absolute differences (MRSAD) cost criterion.

In another example aspect, a method of processing video is disclosed. The method includes performing a conversion between a current block of visual media data and a corresponding coded representation of the visual media data, wherein the conversion of the current block includes determining whether a use of one or both of a bi-directional optical flow (BIO) technique or a decoder-side motion vector refinement (DMVR) technique to the current block is enabled or disabled, and wherein the determining the use of the BIO technique or the DMVR technique is based on computing that a mean value difference of a pair of reference blocks associated with the current block exceeds a threshold value.

In another example aspect, a method of processing video is disclosed. The method includes modifying a first reference block to generate a first modified reference block, and a second reference block to generate a second modified reference block, wherein both the first reference block and the second reference block are associated with a current block of visual media data; determining differences between the first modified reference block and the second modified reference block, the differences including one or more of: a sum of absolute transformed differences (SATD), a mean removed sum of absolute transformed differences (MRSATD), a sum of squares error (SSE), a mean removed sum of squares error (MRSSE), a mean value difference, or gradient values; and performing a conversion between the current block of visual media data and a corresponding coded representation of the visual media data, wherein the conversion includes a use of the differences between the first modified reference block and the second modified reference block generated from respectively modifying the first reference block and the second reference block.

In another example aspect, a method of processing video is disclosed. The method includes determining a temporal gradient or a modified temporal gradient using reference pictures associated with a current block of visual media data, the temporal gradient or the modified temporal gradient indicative of differences between the reference pictures; and performing a conversion between the current block of visual media data and a corresponding coded representation of the visual media data, wherein the conversion includes a use of a bi-directional optical flow (BIO) technique based in part on the temporal gradient or the modified temporal gradient.

In another example aspect, a method of processing video is disclosed. The method includes determining a first temporal gradient using reference pictures associated with a first video block or a sub-block thereof; determining a second temporal gradient using reference pictures associated with a second video block or a sub-block thereof; performing a modification of the first temporal gradient and a modification of the second temporal gradient to generate a modified first temporal gradient and a modified second temporal gradient, wherein the modification of the first temporal gradient associated with the first video block is different from the modification of the second temporal gradient associated with the second video block; and performing a conversion of the first video block and the second video block to their corresponding coded representation.

In another example aspect, a method of processing video is disclosed. The method includes modifying one or both of a first inter reference block and a second inter reference block associated with a current block; determining, based on using the one or both modified first inter reference block and/or the modified second inter reference block, a spatial gradient associated with the current block in accordance with applying a bi-directional optical (BIO) flow technique; and performing a conversion between the current block and a corresponding coded representation, wherein the conversion includes a use of the spatial gradient associated with the current block.

In another example aspect, a method of processing video is disclosed. The method includes performing a determination, by a processor, that a flag signaled at a block level indicates, at least in part, that one or both of a decoder-side motion vector refinement (DMVR) technique or a bi-directional optical flow (BIO) technique is to be enabled for a current block; and performing a conversion between the current block and a corresponding coded representation, wherein the coded representation includes the flag indicating whether the one or both of the DMVR technique and/or the BIO technique is enabled.

In another example aspect, a method of processing video is disclosed. The method includes performing a determination, by a processor that a decoder-side motion vector refinement (DMVR) technique is to be enabled for a current block, wherein the determination is based exclusively on a height of the current block; and performing a conversion between the current block and a corresponding coded representation.

In another example aspect, a method of processing video is disclosed. The method includes performing a conversion between a current block of visual media data and a corresponding coded representation of visual media data, wherein the conversion includes a use of rules associated with one or both of a decoder-side motion vector refinement (DMVR) technique or a bi-directional optical flow (BIO) technique on the current block, wherein the rules associated with the DMVR technique are consistent with application to the BIO technique; and wherein determining whether the use of the one or both of the BIO technique or the DMVR technique on the current block is enabled or disabled is based on applying the rules.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 20 is a flowchart for an example of a video processing method.

DETAILED DESCRIPTION

To improve compression ratio of video, researchers are continually looking for new techniques by which to encode video. The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for improving readability and do not limit the scope of techniques and embodiments described in each section only to that section. Furthermore, while certain terms from various existing video codec standards are used, the disclosed technologies are not limited only to these video standards or their successors and are applicable to other video codec standards. Furthermore, in some cases, techniques are disclosed using corresponding coding steps, and it will be understood that, at a decoder, the corresponding decoding steps in reverse order will be performed. In addition, coding may also be used to perform transcoding in which a video is represented from one coded representation (e.g., one bitrate) to another coded representation (e.g., a different bitrate).

1. SUMMARY

This patent document is related to video coding technologies. Specifically, it is related to motion compensation in video coding. It may be applied to the existing video coding standard like HEVC, or the standard (Versatile Video Coding) to be finalized. It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) could be found at:
http://phenix.it-sudparis.eu/jvet/doc_end_user/documents/11_Ljubljana/wg11/JVET-K1001-v7.zip. The latest reference software of VVC, named VTM, could be found at: https://vcgit.hhi.fraunhofer.de/jvet/VVCSoftware_VTM/tags/VTM-2.1.

Figure 9:
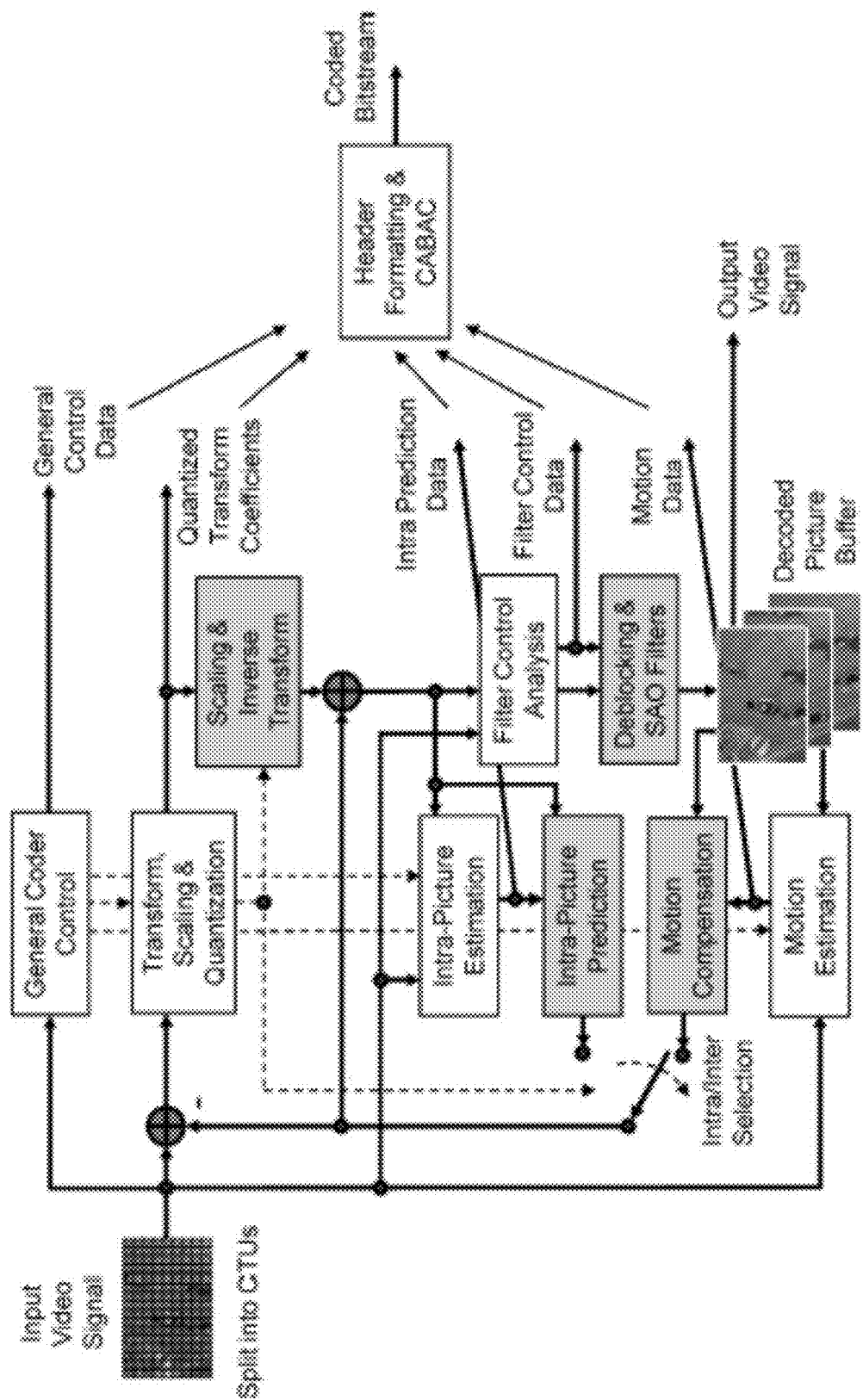
FIG. 9 shows a block diagram of an example implementation of a video encoder.

FIG. 9 is a block diagram of an example implementation of a video encoder. FIG. 9 shows that the encoder implementation has a feedback path built in in which the video encoder also performs video decoding functionality (reconstructing compressed representation of video data for use in encoding of next video data).

2.1 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived as:

$$M = \max\left\{4, \min\left\{\frac{M}{2^D}, \frac{N}{2^D}\right\}\right\} \quad (1)$$

Figure 1:
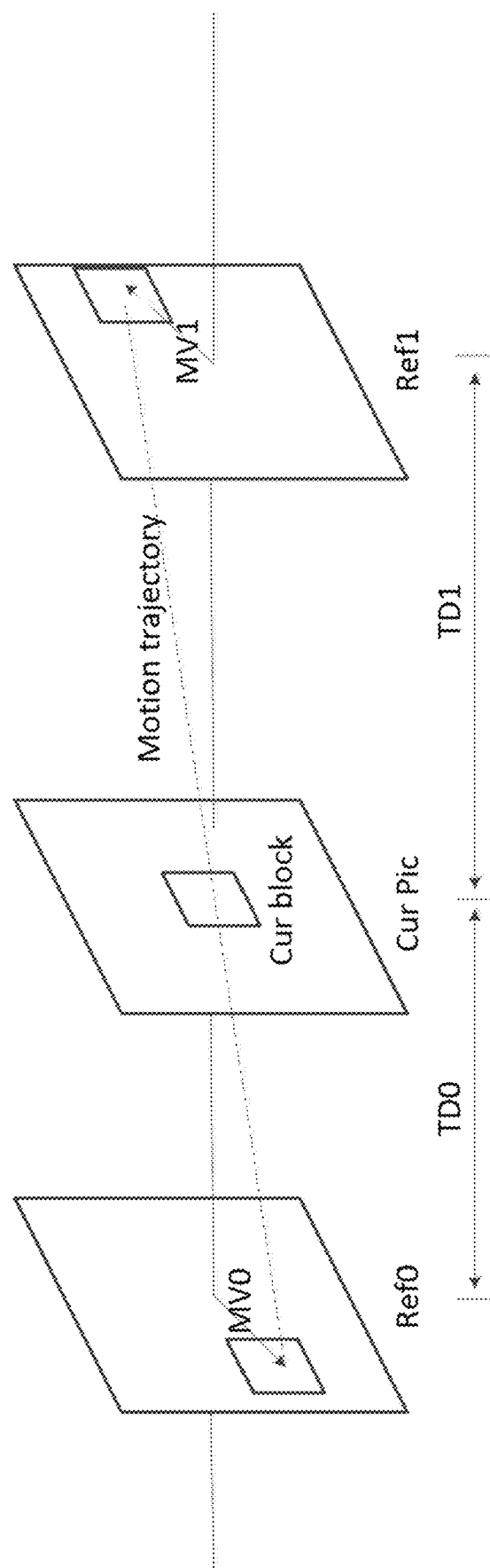
FIG. 1 shows an example of bilateral matching.

As shown in FIG. 1, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 2:
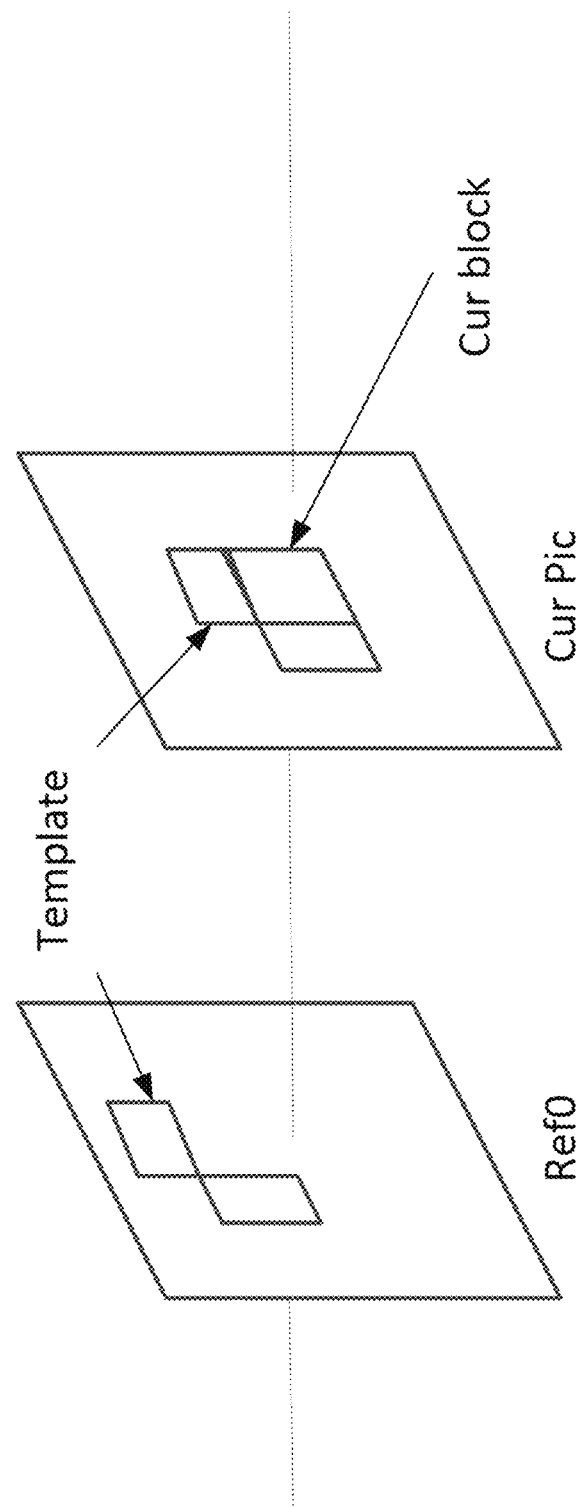
FIG. 2 shows an example of template matching.

As shown in FIG. 2, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

CU Level MV Candidate Set

The MV candidate set at CU level can include:
Original AMVP candidates if the current CU is in AMVP mode,
all merge candidates,
several MVs in the interpolated MV field, which is introduced in section 2.1.1.3, and
top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

Sub-CU Level MV Candidate Set

The MV candidate set at sub-CU level can include:
an MV determined from a CU-level search,
top, left, top-left and top-right neighbouring MVs,
scaled versions of collocated MVs from reference pictures,
up to 4 ATMVP candidates, and
up to 4 STMVP candidates.

The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

Generation of Interpolated MV Field

Before coding a frame, interpolated motion field is generated for the whole picture based on unilateral ME. Then the motion field may be used later as CU level or sub-CU level MV candidates.

Figure 3:
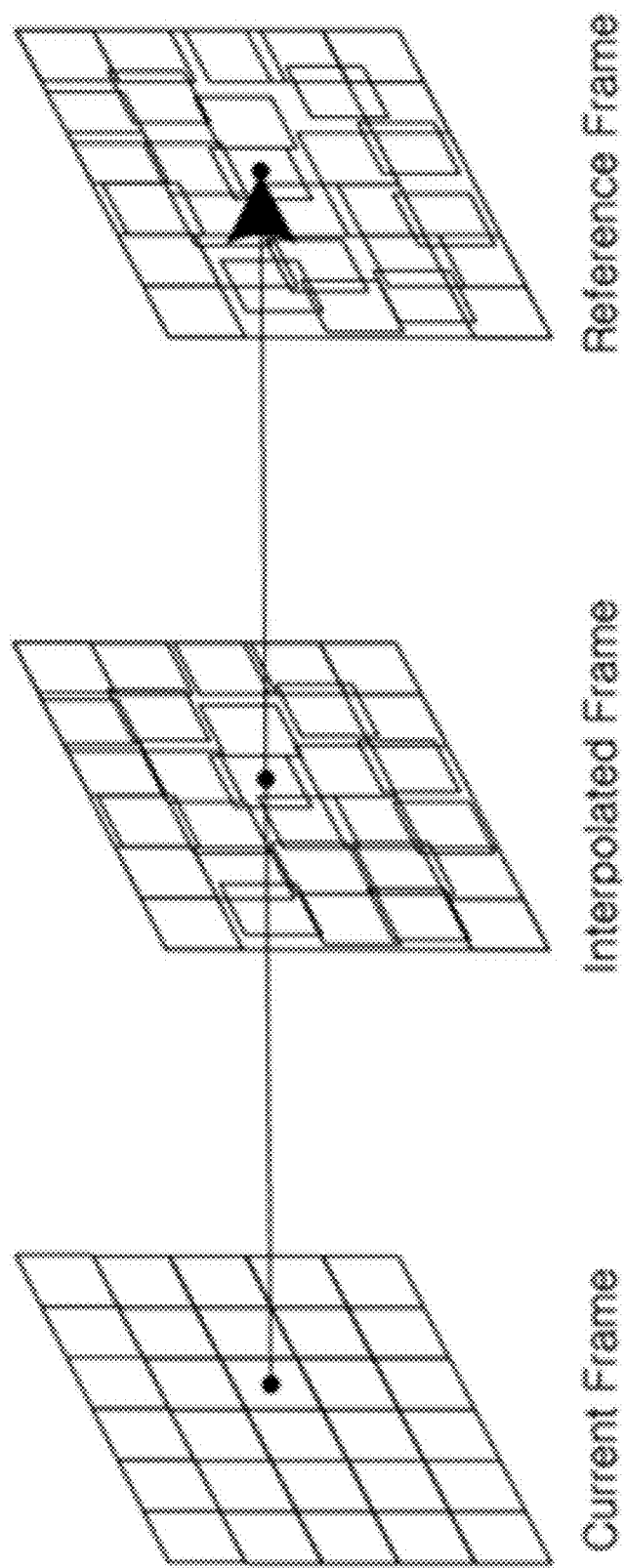
FIG. 3 shows an example of unilateral motion estimation (ME) in Frame-Rate Up Conversion (FRUC).

First, the motion field of each reference pictures in both reference lists is traversed at 4×4 block level. For each 4×4 block, if the motion associated to the block passing through a 4×4 block in the current picture (as shown in FIG. 3) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and Matching Cost

When a motion vector points to a fractional sample position, motion compensated interpolation can be performed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad (2)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min(cost0, cost1)

bi-prediction is used;
Otherwise, if cost0<=cost1
uni-prediction from list0 is used;
Otherwise,
uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

Hybrid Intra and Inter Prediction

In JVET-L0100, multi-hypothesis prediction is proposed, wherein hybrid intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as ($w\_intra_i$, $w\_inter_i$), where i is from 1 to 4 and ($w\_intra_1$, $w\_inter_1$)=(6, 2), ($w\_intra_2$, $w\_inter_2$)=(5, 3), ($w\_intra_3$, $w\_inter_3$)=(3, 5), and ($w\_intra_4$, $w\_inter_4$)=(2, 6), will be applied to a corresponding region. ($w\_intra_1$, $w\_inter_1$) is for the region closest to the reference samples and ($w\_intra_4$, $w\_inter_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

Bi-Directional Optical Flow

In BIO, motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

Bi-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by the equation:

$$\partial I^{(k)}/\partial t + v_x \partial I^{(k)}/\partial x + v_y \partial I^{(k)}/\partial y = 0. \tag{3}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \tag{4}$$

Figure 4:
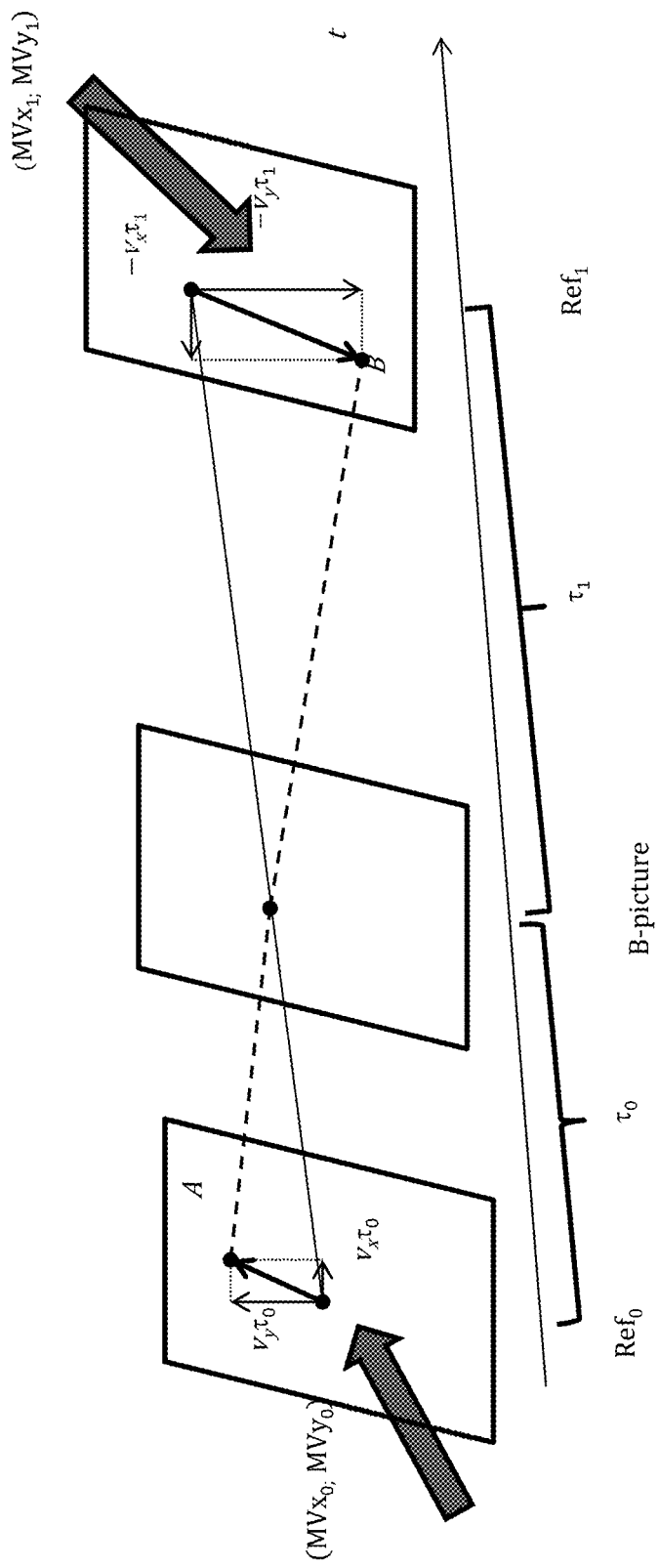
FIG. 4 shows an example of optical flow trajectory.

Here, $\tau_0$ and $\tau_1$ denote the distances to the reference frames as shown on FIG. 4. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \tau_1 < 0$). In this case, BIO is applied only if the prediction is not from the same time moment (i.e., $\tau_0 \neq \tau_1$), both referenced regions have non-zero motion (MVx$_0$, MVy$_0$, MVx$_1$, MVy$_1 \neq 0$) and the block motion vectors are proportional to the time distance (MVx$_0$/MVx$_1$=MVy$_0$/MVy$_1$=−$\tau_0$/$\tau_1$).

The motion vector field $(v_x, v_y)$ is determined by minimizing the difference Δ between values in points A and B (intersection of motion trajectory and reference frame planes on FIG. 9). Model uses only first linear term of a local Taylor expansion for Δ as:

$$\Delta = (I^{(0)} - I^{(1)}{}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \tag{5}$$

All values in Equation 5 depend on the sample location (i',j'), which was omitted from the notation so far. Assuming the motion is consistent in the local surrounding area, the value of Δ can be minimized inside the (2M+1)×(2M+1) square window Ω centered on the currently predicted point (i,j), where M is equal to 2:

$$(v_x, v_y) = \underset{v_x, v_y}{\arg\min} \sum_{[i',j'] \in \Omega} \Delta^2[i', j'] \tag{6}$$

For this optimization problem, the JEM uses a simplified approach making first a minimization in the vertical direction and then in the horizontal direction. This results in $$v_x = (s_1 + r) > m \,?\, \text{clip3}\left(-thBIO, thBIO, -\frac{s_3}{(s_1 + r)}\right):0 \tag{7}$$

$$v_y = (s_5 + r) > m \,?\, \text{clip3}\left(-thBIO, thBIO, -\frac{s_6 - v_x s_2/2}{(s_5 + r)}\right):0 \tag{8}$$

where, $$s_1 = \sum_{[i',j'] \in \Omega} (\tau_1 \partial I^{(1)}/\partial x + \tau_0 \partial I^{(0)}/\partial x)^2; \tag{9}$$

$$s_3 = \sum_{[i',j'] \in \Omega} (I^{(1)} - I^{(0)})(\tau_1 \partial I^{(1)}/\partial x \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y \tau_0 \partial I^{(0)}/\partial y)$$

In order to avoid division by zero or a very small value, regularization parameters r and m are introduced in Equations 7 and 8 where:

$$r = 500 \cdot 4^{d-8} \tag{10}$$

$$m = 700 \cdot 4^{d-8} \tag{11}$$

Here d is bit depth of the video samples.

Figure 5B:
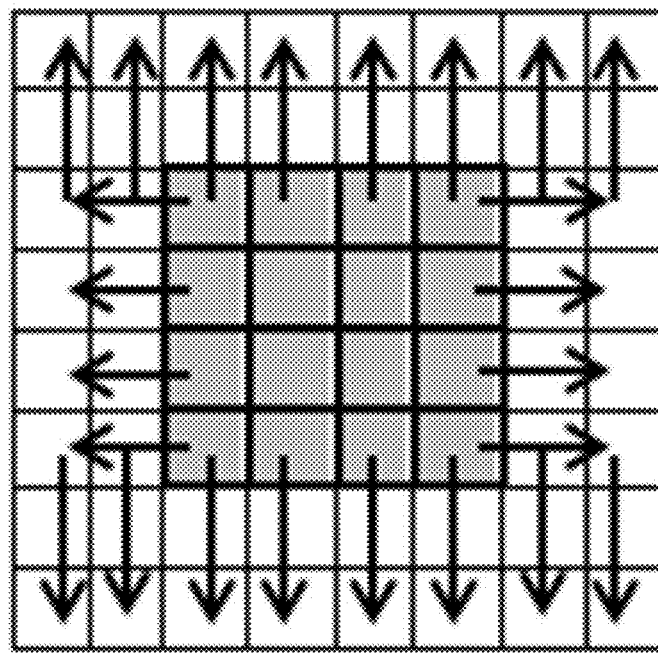
FIGS. 5A and 5B show examples of bi-directional optical flow (BIO) without block extension.
Figure 5A:
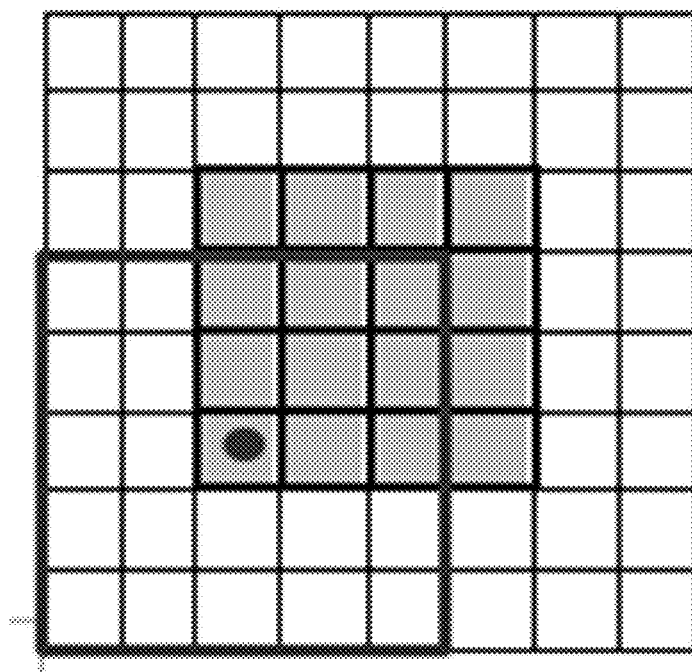

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 9, (2M+1)×(2M+1) square window Ω centered in currently predicted point on a boundary of predicted block can access positions outside of the block (as shown in FIG. 5(a)). In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 5(b).

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 9 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y) \in b_k} \sum_{[i',j'] \in \Omega(x,y)} (\tau_1 \partial I^{(1)}/\partial x + \tau_0 \partial I^{(0)}/\partial x)^2; \tag{12}$$

$$s_{3,b_k} = \sum_{(x,y) \in b_k} \sum_{[i',j'] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y) \in b_k} \sum_{[i',j'] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j'] \in \Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations 7 and 8 are replaced by $((s_{n,bk}) >> 4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I^{(k)}/\partial x$ signal first interpolated vertically using BIOfilterS corresponding to the fractional position fracY with de-scaling shift d-8, then gradient filter BIOfilterG is applied in horizontal direction corresponding to the fractional position fracX with de-scaling shift by 18-d. In case of vertical gradient $\partial I^{(k)}/\partial y$ first gradient filter is applied vertically using BIOfilterG corresponding to the fractional position fracY with de-scaling shift d-8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

A two-stage early termination method is used to conditionally disable the BIO operations depending on the similarity between the two prediction signals. The early termination is first applied at the CU-level and then at the sub-CU-level. Specifically, the proposed method first calculates the SAD between the L0 and L1 prediction signals at the CU level. Given that the BIO is only applied to luma, only the luma samples can be considered for the SAD calculation. If the CU-level SAD is no larger than a predefined threshold, the BIO process is completely disabled for the whole CU. The CU-level threshold is set to $2^{(BDepth-9)}$ per sample. If the BIO process is not disabled at the CU level, and if the current CU includes multiple sub-CUs, the SAD of each sub-CU inside the CU will be calculated. Then, the decision on whether to enable or disable the BIO process is made at the sub-CU-level based on a predefined sub-CU-level SAD threshold, which is set to $3*2^{(BDepth-10)}$ per sample.

2.4 Specification for BDOF in VVC

Specification of BDOF (in JVET-N1001-v2) is as follows:
8.5.7.4 Bidirectional Optical Flow Prediction Process
Inputs to this process are:
    two variables nCbW and nCbH specifying the width and the height of the current coding block,
    two (nCbW+2)×(nCbH+2) luma prediction sample arrays predSamplesL0 and predSamplesL1,
    the prediction list utilization flags predFlagL0 and predFlagL1,
    the reference indices refIdxL0 and refIdxL1,
    the bidirectional optical flow utilization flags bdofUtilizationFlag[xIdx][yIdx] with xIdx=0 . . . (nCbW>>2)−1, yIdx=0 . . . (nCbH>>2)−1.
Output of this process is the (nCbW)×(nCbH) array pbSamples of luma prediction sample values.
Variables bitDepth, shift1, shift2, shift3, shift4, offset4, and mvRefineThres are derived as follows:
    The variable bitDepth is set equal to BitDepth$_Y$.
    The variable shift1 is set to equal to Max(2, 14−bitDepth).
    The variable shift2 is set to equal to Max(8, bitDepth−4).
    The variable shift3 is set to equal to Max(5, bitDepth−7).
    The variable shift4 is set equal to Max(3, 15−bitDepth) and the variable offset4 is set equal to 1<<(shift4−1).
    The variable mvRefineThres is set equal to Max(2, 1<<(13−bitDepth)).
For xIdx=0 . . . (nCbW>>2)−1 and yIdx=0 . . . (nCbH>>2)−1, the following applies:
    The variable xSb is set equal to (xIdx<<2)+1 and ySb is set equal to (yIdx<<2)+1.
    If bdofUtilizationFlag[xSbIdx][yIdx] is equal to FALSE, for x=xSb−1 . . . xSb+2, y=ySb−1 . . . ySb+2, the prediction sample values of the current subblock are derived as follows:

pbSamples[x][y]=Clip3(0,($2^{bitDepth}$)−1,(predSamplesL0[x+1][y+1]+offset2+predSamplesL1[x+1][y+1])>>shift2)     (8-852)

Otherwise (bdofUtilizationFlag[xSbIdx][yIdx] is equal to TRUE), the prediction sample values of the current subblock are derived as follows:
    For x=xSb−1 . . . xSb+4, y=ySb−1 . . . ySb+4, the following ordered steps apply:

1. The locations $(h_x, v_y)$ for each of the corresponding sample locations (x, y) inside the prediction sample arrays are derived as follows:

$$h_x = \text{Clip3}(1, nCbW, x) \quad (8\text{-}853)$$

$$v_y = \text{Clip3}(1, nCbH, y) \quad (8\text{-}854)$$

2. The variables gradientHL0[x][y], gradientVL0[x][y], gradientHL1[x][y] and gradientVL1[x][y] are derived as follows:

$$\text{gradient}HL0[x][y] = (\text{predSamples}L0[h_x+1][v_y] - \text{pred-SampleL0}[h_x-1][v_y]) >> \text{shift1} \quad (8\text{-}855)$$

$$\text{gradient}VL0[x][y] = (\text{predSample}L0[h_x][v_y+1] - \text{SampleL0}[h_x][v_y-1]) >> \text{shift1} \quad (8\text{-}856)$$

$$\text{gradient}HL1[x][y] = (\text{predSamples}L1[h_x+1][v_y] - \text{SampleL1}[h_x-1][v_y]) >> \text{shift1} \quad (8\text{-}857)$$

$$\text{gradient}VL1[x][y] = (\text{predSample}L1[h_x][v_y+1] - \text{SampleL1}[h_x][v_y-1]) >> \text{shift1} \quad (8\text{-}858)$$

3. The variables temp[x][y], tempH[x][y] and tempV[x][y] are derived as follows:

$$\text{diff}[x][y] = (\text{predSamples}L0[h_x][v_y] >> \text{shift2}) - (\text{predSamples}L1[h_x][v_y] >> \text{shift2}) \quad (8\text{-}859)$$

$$\text{temp}H[x][y] = (\text{gradient}HL0[x][y] + \text{gradient}HL1[x][y]) >> \text{shift3} \quad (8\text{-}860)$$

$$\text{temp}V[x][y] = (\text{gradient}VL0[x][y] + \text{gradient}VL1[x][y]) >> \text{shift3} \quad (8\text{-}861)$$

The variables sGx2, sGy2, sGxGy, sGxdI and sGydI are derived as follows:

$$sGx2 = \Sigma_i \Sigma_j (\text{temp}H[xSb+i][ySb+j] * \text{temp}H[xSb+i][ySb+j]) \text{ with } i,j=-1\ldots 4 \quad (8\text{-}862)$$

$$sGy2 = \Sigma_i \Sigma_j (\text{temp}V[xSb+i][ySb+j] * \text{temp}V[xSb+i][ySb+j]) \text{ with } i,j=-1\ldots 4 \quad (8\text{-}863)$$

$$sGxGy = \Sigma_i \Sigma_j (\text{temp}H[xSb+i][ySb+j] * \text{temp}V[xSb+i][ySb+j]) \text{ with } i,j=-1\ldots 4 \quad (8\text{-}864)$$

$$sGxdI = \Sigma_i \Sigma_j (-\text{temp}H[xSb+i][ySb+j] * \text{diff}[xSb+i][ySb+j]) \text{ with } i,j=-1\ldots 4 \quad (8\text{-}865)$$

$$sGydI = \Sigma_i \Sigma_j (-\text{temp}V[xSb+i][ySb+j] * \text{diff}[xSb+i][ySb+j]) \text{ with } i,j=-1\ldots 4 \quad (8\text{-}866)$$

The horizontal and vertical motion offset of the current subblock are derived as:

$$v_x = sGx2 > 0 ? \text{Clip3}(-\text{mvRefineThres}, \text{mvRefineThres}, -(sGxdI << 3) >> \text{Floor}(\text{Log }2(sGx2))) : 0 \quad (8\text{-}867)$$

$$v_y = sGy2 > 0 ? \text{Clip3}(-\text{mvRefineThres}, \text{mvRefineThres}, ((sGydI << 3) - ((v_x * sGxGy_m) << 12 + v_x * sGxGy_s) >> 1) >> \text{Floor}(\text{Log }2(sGx2))) : 0 \quad (8\text{-}868)$$

For $x = xSb-1 \ldots xSb+2$, $y = ySb-1 \ldots ySb+2$, the prediction sample values of the current sub-block are derived as follows:

$$\text{bdofOffset} = \text{Round}((v_x * (\text{gradient}HL1[x+1][y+1] - \text{gradient}HL0[x+1][y+1])) >> 1) + \text{Round}((v_y * (\text{gradient}VL1[x+1][y+1] - \text{gradient}VL0[x+1][y+1])) >> 1) \quad (8\text{-}869)$$

[Ed. (JC): Round( ) operation is defined for float input. The Round( ) operation seems redundant here since the input is an integer value. To be confirmed by the proponent]

$$\text{pbSamples}[x][y] = \text{Clip3}(0, (2^{bitDepth}) - 1, (\text{predSamples}L0[x+1][y+1] + \text{offset4} + \text{predSamples}L[x+1][y+1] + \text{bdofOffset}) >> \text{shift4}) \quad (8\text{-}870)$$

The spatial gradient is calculated as follows:

$$\text{gradient}HL0[x][y] = (\text{predSamples}L0[h_x+1][v_y] - \text{SampleL0}[h_x-1][v_y]) >> \text{shift1} \quad (8\text{-}855)$$

On the other hand, temporal gradient is calculated as follows:

$$\text{diff}[x][y] = (\text{predSamples}L0[h_x][v_y] >> \text{shift2}) - (\text{predSamples}L1[h_x][v_y] >> \text{shift2}) \quad (8\text{-}859)$$

Thus, the calculation of spatial gradient and temporal gradient is not aligned.

2.5 Decoder-Side Motion Vector Refinement

In bi-prediction operation, for the prediction of one block region, two prediction blocks, formed using a motion vector (MV) of list0 and a MV of list1, respectively, are combined to form a single prediction signal. In JVET-K0217, the decoder-side motion vector refinement (DMVR) method, the two motion vectors of the bi-prediction are further refined by a bilateral matching process.

In the proposed method DMVR is applied only in Merge and Skip modes, if the following condition is true:

(POC−POC0)*(POC−POC1)<0, where POC is the picture order count of current to be encoded picture, POC0 and POC1 are picture order counts of the references for the current picture.

The signaled merge candidate pair is used as input to DMVR process and are denoted initial motion vectors (MV0, MV1). The search points that are searched by DMVR obey the motion vector difference mirroring condition. In other words any point that is checked by DMVR, denoted by candidate motion vector pair (MV0', MV1') obey the following two equations:

$$MV0' = MV0 + MV_{diff}$$

$$MV1' = MV1 - MV_{diff}$$

where $MV_{diff}$ represents the points in the search space in one of the reference pictures.

After the construction of the search space the uni-lateral predictions are constructed using regular 8-tap DCTIF interpolation filter. Bilateral matching cost function is calculated by using MRSAD (mean removed sum of absolute differences) between the two predictions (FIG. 6) and the search point resulting in the minimum cost is selected as the refined MV pair. For the MRSAD calculation 16 bit precision of samples is used (which is the output of the interpolation filtering), and no clipping and no rounding operations are applied before MRSAD calculation. The reason for not applying rounding and clipping is to reduce internal buffer requirement.

Figure 6:
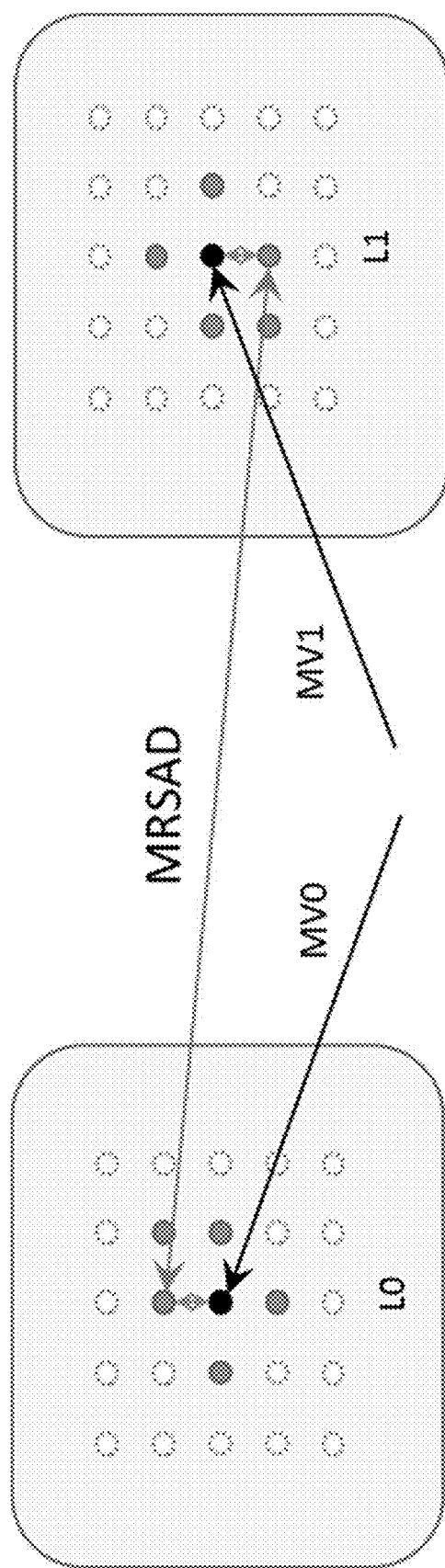
FIG. 6 shows an example of bilateral matching with 6 points search.

FIG. 6 shows an example of bilateral matching with 6 points search.

In the proposed method the integer precision search points are chosen by the Adaptive pattern method. The cost, corresponding to the central points (pointed by the initial motion vectors) is calculated firstly. The other 4 costs (in sign shape) is calculated by the two predictions, located at the opposite sides of each other by the central point. Last 6$^{th}$ point at the angle is chosen by the gradient of the previous calculated costs (FIG. 7).

Figure 7:
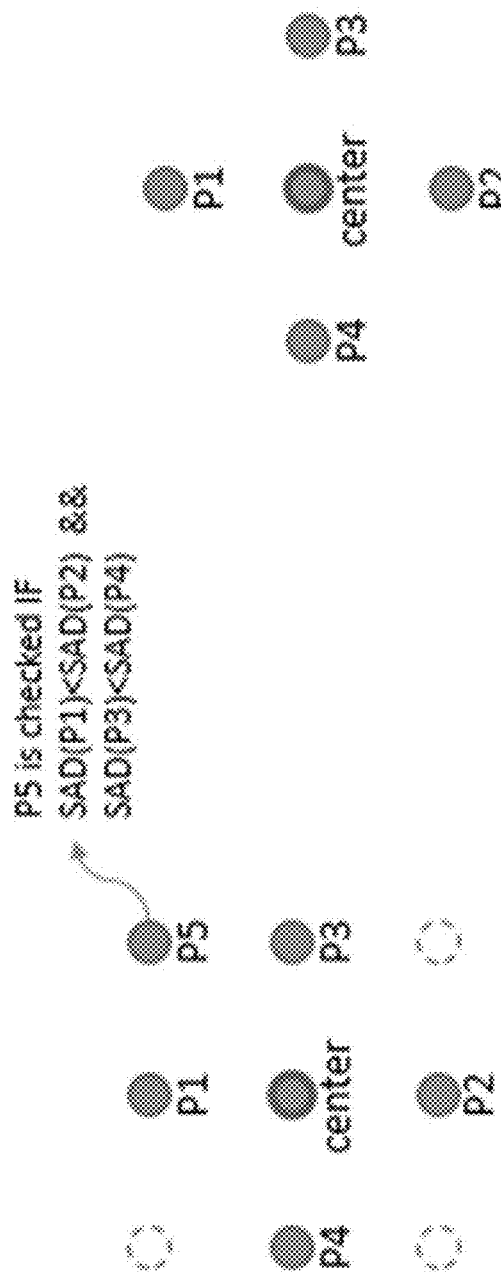
FIG. 7 shows examples of an adaptive integer search pattern and a half sample search pattern.

FIG. 7 shows examples of an adaptive integer search pattern and a half sample search pattern.

The output of the DMVR process is the refined motion vector pair corresponding to the minimal cost.

If after one iteration the minimum cost is achieved at the central point of the search space, i.e. the motion vectors are not changed, and the refinement process is terminated. Otherwise, the best cost further is regarded as center, and the process continues, while the minimal cost does not correspond to the central point and the search range is not exceeded.

Half sample precision search is applied only if application of half-pel search does not exceed the search range. In this case only 4 MRSAD calculations are performed, corresponding to plus shape points around the central one, which is chosen as the best during the integer precision search. At the end the refined motion vector pair is output that correspond to the minimal cost point.

Some simplifications and improvements are further proposed in JVET-L0163.

Reference Sampling Padding

Reference sample padding is applied in order to extend the reference sample block that is pointed by the initial motion vector. If the size of the coding block are given by "w" and "h", then it is assumed that a block of size w+7 and h+7 is retrieved from the reference picture buffer. The retrieved buffer is then extended by 2 samples in each direction by repetitive sample padding using the nearest sample. Afterwards the extended reference sample block is used to generate the final prediction once the refined motion vector is obtained (which can deviate from the initial motion vector 2 samples in each direction).

It is noted that this modification eliminates the external memory access requirement of DMVR completely without any coding loss.

Bilinear Interpolation Instead of 8-Tap DCTIF

According to the proposal bilinear interpolation is applied during the DMVR search process, which means that the predictions used in MRSAD computation are generated using bilinear interpolation. Once the final refined motion vectors are obtained regular 8-tap DCTIF interpolation filter is applied to generate final predictions.

Disabling of DMVR for Small Blocks

DMVR is disabled for blocks 4×4, 4×8 and 8×4.

Early Termination Based on MV Difference Between Merge Candidates

An additional condition is imposed on DMVR to confine the MV refinement process. With it, DMVR is conditionally disabled when the below condition is satisfied.

The MV difference between the selected merge candidate and any of the previous ones in the same merge list is less than a pre-defined threshold (that is, ¼-, ½- and 1-pixel-wide intervals for CUs with less than 64 pixels, less than 256 pixels and at least 256 pixels, respectively).

Early Termination Based on SAD Cost at the Center Search Coordinate

The sum of absolute difference (SAD) between the two prediction signals (L0 and L1 prediction) using the initial motion vectors of the current CU is calculated. If the SAD is no larger than a predefined threshold, i.e., $2^{(BDepth-9)}$ per sample, the DMVR is skipped; otherwise, the DMVR is still applied to refine the two motion vectors of the current block.

DMVR Application Condition

The DMVR application condition is (POC−POC1)× (POC−POC2)<0 as it is implemented in BMS2.1 is replaced by the new condition (POC−POC1)==(POC2−POC). This means that DMVR is applied only if reference pictures are in opposite time directions and are equidistant to current picture.

MRSAD Computation Using Every Second Row

The MRSAD cost is computed only for odd numbered rows of a block, the even numbered samples rows are not considered. Accordingly, the number of operations for the MRSAD calculation is halved.

2.6 Related Method

In the patent application identified by Application No. PCT/CN2018/098691 (which is incorporated by reference herein), entitled "Motion Refinement for Visual Media Coding," filed Aug. 4, 2018, a MV update method and a two-step inter prediction method are proposed. The derived MV between reference block 0 and reference block 1 in BIO are scaled and added to the original motion vector of list 0 and list 1. Meanwhile, the updated MV is used to perform motion compensation and a second inter prediction is generated as the final prediction. The temporal gradient is modified by removing the mean difference between reference block 0 and reference block 1.

2.7 DMVR in VVC Draft 4

The usage of DMVR in JVET-M1001_v7 (VVC working draft 4, version 7) is defined as follows:

When all of the following conditions are true, dmvrFlag is set equal to 1:
  sps_dmvr_enabled_flag is equal to 1
  Current block is not coded with triangular prediction mode, AMVR affine mode, sub-block mode (including merge affine mode, and ATMVP mode)
  merge_flag[xCb][yCb] is equal to 1
  both predFlagL0[0][0] and predFlagL1[0][0] are equal to 1
  mmvd_flag[xCb][yCb] is equal to 0
  DiffPicOrderCnt(currPic, RefPicList[0][refIdxL0]) is equal to DiffPicOrderCnt(RefPicList[1][refIdxL1], currPic)
  cbHeight is greater than or equal to 8
  cbHeight*cbWidth is greater than or equal to 64

3. EXAMPLES OF PROBLEMS SOLVED BY EMBODIMENTS

In BIO, difference between two reference blocks or sub-blocks are calculated in the early termination stage, meanwhile, the temporal gradient is also calculated. Because the temporal gradient is actually the difference (or right shifted difference) between two reference pixels, calculating both the difference and the temporal gradient is not meaningful.

In DMVR, the MRSAD calculation is used to decide the refine motion vector of one block.

In BIO, the SAD calculation is used to decide whether BIO should be enabled/disabled for one block or one sub-block using all samples of one block/one sub-block which increases the computation complexity.

The calculation method is different for spatial gradient and temporal gradient.

4. EXAMPLES OF EMBODIMENTS

Denote SATD as sum of absolute transformed differences, MRSATD as mean removed sum of absolute transformed differences, and SSE as sum of squares error, and MRSSE as mean removed sum of squares error.

The detailed techniques below should be considered as examples to explain general concepts. These techniques should not be interpreted in a narrow way. Furthermore, these inventions can be combined in any manner.

In the following discussion, SatShift(x, n) is defined as $$SatShift(x, n) = \begin{cases} (x + offset0) \gg n & \text{if } x \geq 0 \\ -((-x + offset1) \gg n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset) are set to 0.

In another example, offset0=offset1=((1<<n)>>1)−1 or ((1<<(n−1)))−1.

In gradient calculation of BDOF, difference between two neighboring (either spatial neighboring or temporal neighboring) or/and non-adjacent samples may be calculated, and right-shift may be performed during the gradient calculation. Suppose the two neighboring samples are neig0 and neig1, and the right shift value is shift1, and the gradient to be calculated is grad. Note that shift1 may be different for spatial gradient and temporal gradient.

1. It is proposed to align the method used in calculating spatial gradient and temporal gradient.
   a. In one example, gradient is calculated according to the shifted sample differences.
      i. Alternatively, gradient is calculated according to the modified sample (e.g., via shifting) differences.
   b. In one example, in gradient calculation, subtraction may be performed before right shift. E.g., grad=(neig0−neig1)>>shift1.
   c. In one example, in gradient calculation, subtraction may be performed after right shift. E.g., grad=(neig0>>shift1)−(neig1>>shift1).
   d. In one example, in gradient calculation, subtraction may be performed before right shift and an offset may be added before right shift. E.g., grad=(neig0−neig1+offset)>>shift1. The offset may be equal to 1<<(shift1−1) or 1<<shift>>1.
   e. In one example, in gradient calculation, subtraction may be performed after right shift and an offset may be added before right shift. E.g., grad=((neig0+offset)>>shift1)−((neig1+offset)>>shift1). The offset may be equal to 1<<(shift1−1) or 1<<shift>>1.
   f. In one example, the gradient may be calculated as SatShift(neig0−neig1, shift1).
      i. Alternatively, the gradient may be calculated as SatShift(neig0, shift1)−SatShift(neig1, shift1).
2. It is proposed to use other criteria to decide the enabling/disabling of BIO or/and DMVR in the early termination stage, such as SATD or MRSATD or SSE or MRSSE or mean value difference or gradient values.
   a. In one example, the block level and sub-block level enabling/disabling decisions may choose different rules, e.g., one with SAD and the other with SATD.
   b. In one example, for a block/sub-block, if the gradient values (horizontal and/or vertical) or the averaged gradient values or the range of gradient values satisfy a condition, (e.g., larger than a threshold or outside a given range), BIO and/or DMVR may be disabled.
   c. It is proposed that the criteria used to decide the enabling/disabling BIO/DMVR may be signaled from the encoder to the decoder in VPS/SPS/PPS/slice header/tile group header.
3. It is proposed to use other criteria to decide the refined motion vector of one block in DMVR process, such as SATD or MRSATD or SSE or MRSSE to replace MRSAD.
   a. In one example, the refined motion vector of one sub-block in DMVR process, such as SATD or MRSATD or SSE or MRSSE to replace MRSAD.
   b. In one example, if SATD (or MRSATD) is applied, the whole block is split into M×N sub-blocks and SATD (or MRSATD) is calculated for each sub-block. The SATDs (or MRSATDs) for all or some of the sub-blocks are summed up to get the SATD (or MRSATD) value for the whole block.
4. BIO or/and DMVR may be disabled when mean value difference of two reference blocks of one block is larger than a threshold (T1).
   a. BIO may be disabled when mean value difference of two reference sub-blocks of one sub-block is larger than a threshold (T2).
   b. The thresholds T1 and/or T2 may be pre-defined.
   c. The thresholds T1 and/or T2 may be dependent on the block dimension.
5. It is proposed that in the early termination stage of BIO, before calculating the difference (e.g., SAD/SATD/SSE etc.) between the two reference blocks/sub-blocks, the reference blocks or/and sub-blocks may be first modified.
   a. In one example, mean of the reference block or/and sub-block may be calculated and then subtracted by the reference block or/and sub-block.
   b. In one example, methods disclosed in App. No. PCT/CN2018/096384, (which is incorporated by reference herein), entitled "Motion Prediction Based on Updated Motion Vectors," filed on Jul. 20, 2018, may be used to calculate the mean value of the reference block or/and sub-block, i.e., mean value is calculated for some representative positions.
6. It is proposed that in the early termination stage of BIO or/and DMVR, the difference (e.g., SAD/SATD/SSE/MRSAD/MRSATD/MRSSE etc.) between the two reference blocks or/and sub-blocks may be calculated only for some representative positions.
   a. In one example, only difference of even rows is calculated for the block or/and sub-block.
   b. In one example, only difference of four corner samples of one block/sub-block is calculated for the block or/and sub-block.
   c. In one example, the methods disclosed in U.S. Provisional Application No. 62/693,412, (which is incorporated by reference herein) entitled "Decoder Side Motion Vector Derivation in Video Coding," filed Jul. 2, 2018, may be used to select the representative positions.
   d. In one example, the difference (e.g., SAD/SATD/SSE/MRSAD/MRSATD/MRSSE etc.) between the two reference blocks may be calculated only for some representative sub-blocks.
   e. In one example, the difference (e.g., SAD/SATD/SSE/MRSAD/MRSATD/MRSSE etc.) calculated for representative positions or sub-blocks are summed up to get the difference for the whole block/sub-block.
7. It is proposed that temporal gradient (temporal gradient at position (x,y) is defined as G(x,y)=P0(x,y)−P1(x,y), where P0(x,y) and P1(x,y) represent the prediction at (x,y) from two different reference pictures) or modified temporal gradient is used as the difference (instead of SAD) in the early termination stage of BIO, and the threshold used in early termination may be adjusted accordingly.

a. In one example, absolute sum of the temporal gradients is calculated and used as the difference of the two reference blocks or/and sub-blocks.
b. In one example, absolute sum of the temporal gradients is calculated only on some representative positions for the block or/and sub-block.
c. In one example, the methods disclosed in U.S. Provisional Application No. 62/693,412, (which is incorporated by reference herein) entitled "Decoder Side Motion Vector Derivation in Video Coding," filed Jul. 2, 2018, may be used to select the representative positions.

8. It is proposed that the temporal gradient modification process may be performed adaptively for different blocks/sub-blocks.
   a. In one example, the temporal gradient is modified only when the absolute mean difference (or SAD/SATD/SSE etc.) between the two reference blocks is greater than a threshold T, for example, T=4.
   b. In one example, the temporal gradient is modified only when the absolute mean difference (or SAD/SATD/SSE etc.) between the two reference blocks is less than a threshold T, for example, T=20.
   c. In one example, the temporal gradient is modified only when the absolute mean difference (or SAD/SATD/SSE etc.) between the two reference blocks is in the range of [T1, T2], for example, T1=4, T2=20.
   d. In one example, if the absolute mean difference (or SAD/SATD/SSE etc.) between the two reference blocks is greater than a threshold T (for example, T=40), BIO is disabled.
   e. In one example, these thresholds may be predefined implicitly.
   f. In one example, these thresholds may be signaled in SPS/PPS/picture/slice/tile level.
   g. In one example, these thresholds may be different for different CU, LCU, slice, tile or picture.
      i. In one example, these thresholds may be designed based on decoded/encoded pixel values.
      ii. In one example, these thresholds may be designed differently for different reference pictures.
   h. In one example, the temporal gradient is modified only when (absolute) mean of the two (or anyone of the two) reference blocks is greater than a threshold T, for example, T=40.
   i. In one example, the temporal gradient is modified only when (absolute) mean of the two (or anyone of the two) reference blocks is smaller than a threshold T, for example, T=100.
   j. In one example, the temporal gradient is modified only when (absolute) mean of the two (or anyone of the two) reference blocks are in the range of [T1, T2], for example, T1=40, T2=100.
   k. In one example, the temporal gradient is modified only when (absolute) mean of the two (or anyone of the two) reference blocks is greater/less than the absolute mean difference (or SAD/SATD etc.) multiplied by T, in one example, T=4.5.
   l. In one example, the temporal gradient is modified only when (absolute) mean of the two (or anyone of the two) reference blocks is in the range of the absolute mean difference (or SAD/SATD etc.) multiplied by [T1, T2], in one example, T1=4.5, T2=7.

9. It is proposed that in hybrid intra and inter prediction mode, the two inter reference blocks may be modified when calculating the spatial gradients in BIO, or they may be modified before performing the entire BIO procedure.
   a. In one example, the intra prediction block and the inter prediction block in each prediction direction are weighted averaged (using same weighting method as in hybrid inter and inter prediction) to generate two new prediction blocks, denoted as wAvgBlkL0 and wAvgBlkL1, which are used to derive the spatial gradients in BIO.
   b. In one example, wAvgBlkL0 and wAvgBlkL1 are used to generate the prediction block of the current block, denoted as predBlk. Then, wAvgBlkL0, wAvgBlkL1 and predBlk are further used for the BIO procedure, and the refined prediction block generated in BIO is used as the final prediction block.

10. It is proposed that a DMVR or/and BIO flag may be signaled at block level to indicate whether DMVR or/and BIO is enabled for the block.
    a. In one example, such flag may be signaled only for AMVP mode, and in merge mode, such flag may be inherited from spatial or/and temporal neighboring blocks.
    b. In one example, whether BIO or/and DMVR is enabled or not may be decided jointly by the signaled flag and the on-the-fly decision (for example, the decision based on SAD in the early termination stage). The signaled flag may indicate whether the on-the-fly decision is correct or not.
    c. Such flag is not signaled for uni-predicted blocks.
    d. Such flag may be not signaled for bi-predicted blocks whose two reference pictures are both preceding pictures or following pictures in display order.
    e. Such flag may be not signaled for bi-predicted blocks if POC_diff(curPic, ref0) is not equal to POC_diff (ref1, curPic), wherein POC_diff ( ) calculates the POC difference between two pictures, and ref0 and ref1 are the reference pictures of current picture.
    f. Such a flag is not signaled for intra coded blocks. Alternatively, furthermore, such a flag is not signaled for blocks coded with the hybrid intra and inter prediction mode.
       Alternatively, such a flag is not signaled for current picture referencing block, i.e. the reference picture is the current picture.
    g. Whether to signal the flag may depend on the block dimension. For example, if the block size is smaller than a threshold, such a flag is not signaled. Alternatively, if the block width and/or height is equal to or larger than a threshold, such a flag is not signaled.
    h. Whether to signal the flag may depend on the motion vector precision. For example, if the motion vector is in integer precision, such a flag is not signaled.
    i. If such a flag is not signaled, it may be derived to be true or false implicitly.
    j. A flag may be signaled at slice header/tile header/PPS/SPS/VPS to indicate whether this method is enabled or not.
    k. Such signaling method may depend on the temporal layer of the picture, for example, it may be disabled for picture with high temporal layer.
    l. Such signaling method may depend on the QP of the picture, for example, it may be disabled for picture with high QP.

11. Instead of checking both block height and block size, it is proposed to decide whether to enable or disable DMVR according to the block height only.
   a. In one example, DMVR may be enabled when the block height is greater than T1 (e.g., T1=4).
   b. In one example, DMVR may be enabled when the block height is equal to or greater than T1 (e.g., T1=8).
12. The above methods which are applied to DMVR/BIO may be only applicable to other decoder-side motion vector derivation (DMVD) methods, such as prediction refinement based on optical flow for the affine mode.
   a. In one example, the condition check for usage determination of DMVR and BIO may be aligned, such as whether block height satisfies same threshold.
      i. In one example, DMVR and BIO may be enabled when the block height is equal to or greater than T1 (e.g., T1=8).
      ii. In one example, DMVR and BIO may be enabled when the block height is greater than T1 (e.g., T1=4).

5. EMBODIMENTS

5.1 Embodiment #1

The usage of DMVR in JVET-M1001_v7 (VVC working draft 4, version 7) is modified as follows:
When all of the following conditions are true, dmvrFlag is set equal to 1:
   sps_dmvr_enabled_flag is equal to 1
   Current block is not coded with triangular prediction mode, AMVR affine mode, sub-block mode (including merge affine mode, and ATMVP mode)
   merge_flag[xCb][yCb] is equal to 1
   both predFlagL0[0][0] and predFlagL1[0][0] are equal to 1
   mmvd_flag[xCb][yCb] is equal to 0
   DiffPicOrderCnt(currPic, RefPicList[0][refIdxL0]) is equal to DiffPicOrderCnt(RefPicList[1][refIdxL1], currPic)
   cbHeight is greater than or equal to 8
   ~~cbHeight*cbWidth is greater than or equal to 64~~

That means, "cbHeight*cbWidth is greater than or equal to 64" is deleted.

5.2 Embodiment #2

The newly added parts are highlighted in boldface italics, and the deleted part are highlighted in strikethrough.

i. One Example 8.5.7.4 Bidirectional Optical Flow Prediction Process
Inputs to this process are:
   two variables nCbW and nCbH specifying the width and the height of the current coding block.
   two (nCbW+2)×(nCbH+2) luma prediction sample arrays predSamplesL0 and predSamplesL1,
   the prediction list utilization flags predFlagL0 and predFlagL1,
   the reference indices refIdxL0 and refIdxL1,
   the bidirectional optical flow utilization flags bdofUtilizationFlag[xIdx][yIdx] with xIdx=0 . . . (nCbW>>2)−1, yIdx=0 . . . (nCbH>>2)−1.

Output of this process is the (nCbW)×(nCbH) array pbSamples of luma prediction sample values.
Variables bitDepth, shift1, shift2, shift3, shift4, offset4, and mvRefineThres are derived as follows:
   The variable bitDepth is set equal to BitDepth$_Y$.
   The variable shift1 is set to equal to Max(2, 14−bitDepth).
   The variable shift2 is set to equal to Max(8, bitDepth−4).
   The variable shift3 is set to equal to Max(5, bitDepth−7).
   The variable shift4 is set equal to Max(3, 15−bitDepth) and the variable offset4 is set equal to 1<<(shift4−1).
   The variable mvRefineThres is set equal to Max(2, 1<<(13−bitDepth)).
For xIdx=0 . . . (nCbW>>2)−1 and yIdx=0 . . . (nCbH>>2)−1, the following applies:
   The variable xSb is set equal to (xIdx<<2)+1 and ySb is set equal to (yIdx<<2)+1.
   If bdofUtilizationFlag[xSbIdx][yIdx] is equal to FALSE, for x=xSb−1 . . . xSb+2, y=ySb−1 . . . ySb+2, the prediction sample values of the current subblock are derived as follows:

$$pbSamples[x][y]=Clip3(0,(2^{bitDepth})-1,(predSamplesL0[x+1][y+1]+offset2+predSamplesL1[x+1][y+1])>>shift2) \quad (8\text{-}852)$$

Otherwise (bdofUtilizationFlag[xSbIdx][yIdx] is equal to TRUE), the prediction sample values of the current subblock are derived as follows:
For x=xSb−1 . . . xSb+4, y=ySb−1 . . . ySb+4, the following ordered steps apply:
4. The locations ($h_x$, $v_y$) for each of the corresponding sample locations (x, y) inside the prediction sample arrays are derived as follows:

$$h_x=Clip3(1,nCbW,x) \quad (8\text{-}853)$$

$$v_y=Clip3(1,nCbH,y) \quad (8\text{-}854)$$

5. The variables gradientHL0[x][y], gradientVL0[x][y], gradientHL1[x][y] and gradientVL1[x][y] are derived as follows:

$$gradientHL0[x][y]=(predSamplesL0[h_x+1][v_y]-predSampleL0[h_x-1][v_y])>>shift1 \quad (8\text{-}855)$$

$$gradientVL0[x][y]=(predSampleL0[h_x][v_y+1]-predSampleL0[h_x][v_y-1])>>shift1 \quad (8\text{-}856)$$

$$gradientHL1[x][y]=(predSamplesL1[h_x+1][v_y]-predSampleL1[h_x-1][v_y])>>shift1 \quad (8\text{-}857)$$

$$gradientVL1[x][y]=(predSampleL1[h_x][v_y+1]-predSampleL1[h_x][v_y-1])>>shift1 \quad (8\text{-}858)$$

6. The variables temp[x][y], tempH[x][y] and tempV[x][y] are derived as follows:

$$diff[x][y]=(predSamplesL0[h_x][v_y]-predSamplesL1[h_x][v_y])>>shift2 \quad (8\text{-}859)$$

$$tempH[x][y]=(gradientHL0[x][y]+gradientHL1[x][y])>>shift3 \quad (8\text{-}860)$$

$$tempV[x][y]=(gradientVL0[x][y]+gradientVL1[x][y])>>shift3 \quad (8\text{-}861)$$

The variables sGx2, sGy2, sGxGy, sGxdI and sGydI are derived as follows:

$$sGx2=\Sigma_i\Sigma_j(tempH[xSb+i][ySb+j]*tempH[xSb+i][ySb+j]) \text{ with } i,j=-1 \ldots 4 \quad (8\text{-}862)$$

$$sGy2=\Sigma_i\Sigma_j(tempV[xSb+i][ySb+j]*tempV[xSb+i][ySb+j]) \text{ with } i,j=-1 \ldots 4 \quad (8\text{-}863)$$

$$sGxGy=\Sigma_i\Sigma_j(\text{temp}H[xSb+i][ySb+j]*\text{temp}V[xSb+i][ySb+j]) \text{ with } i,j=-1\ldots 4 \quad (8\text{-}864)$$

$$sGxdI=\Sigma_i\Sigma_j(-\text{temp}H[xSb+i][ySb+j]*\text{diff}[xSb+i][ySb+j]) \text{ with } i,j=-1\ldots 4 \quad (8\text{-}865)$$

$$sGydI=\Sigma_i\Sigma_j(-\text{temp}V[xSb+i][ySb+j]*\text{diff}[xSb+i][ySb+j]) \text{ with } i,j=-1\ldots 4 \quad (8\text{-}866)$$

The horizontal and vertical motion offset of the current subblock are derived as:

$$v_x=sGx2>0?\text{Clip3}(-\text{mvRefineThres},\text{mvRefineThres},-(sGxdI<<3)>>\text{Floor}(\text{Log }2(sGx2))):0 \quad (8\text{-}867)$$

$$v_y=sGy2>0?\text{Clip3}(-\text{mvRefineThres},\text{mvRefineThres},((sGydI<<3)-((v_x*sGxGy_m)<<12+v_x*sGxGy_s)>>1)>>\text{Floor}(\text{Log }2(sGx2))):0 \quad (8\text{-}868)$$

For x=xSb−1 . . . xSb+2, y=ySb−1 . . . ySb+2, the prediction sample values of the current sub-block are derived as:

$$\text{bdofOffset}=\text{Round}((v_x*(\text{gradient}HL1[x+1][y+1]-\text{gradient}HL0[x+1][y+1]))>>1)+\text{Round}((v_y*(\text{gradient}VL1[x+1][y+1]-\text{gradient}VL0[x+1][y+1]))>>1) \quad (8\text{-}869)$$

[Ed. (JC): Round( ) operation is defined for float input. The Round( ) operation seems redundant here since the input is an integer value. To be confirmed by the proponent]

$$\text{pbSamples}[x][y]=\text{Clip3}(0,(2^{\text{bitDepth}})-1,(\text{predSamplesL0}[x+1][y+1]+\text{offset4}+\text{predSamplesL}[x+1][y+1]+\text{bdofOffset})>>\text{shift4}) \quad (8\text{-}870)$$

ii. One Example 8.5.7.4 Bidirectional Optical Flow Prediction Process
Inputs to this process are:
 two variables nCbW and nCbH specifying the width and the height of the current coding block.
 two (nCbW+2)×(nCbH+2) luma prediction sample arrays predSamplesL0 and predSamplesL1,
 the prediction list utilization flags predFlagL0 and predFlagL1,
 the reference indices refIdxL0 and refIdxL1,
 the bidirectional optical flow utilization flags bdofUtilizationFlag[xIdx][yIdx] with xIdx=0 . . . (nCbW>>2)−1, yIdx=0 . . . (nCbH>>2)−1.
Output of this process is the (nCbW)×(nCbH) array pbSamples of luma prediction sample values.
Variables bitDepth, shift1, shift2, shift3, shift4, offset4, and mvRefineThres are derived as follows:
 The variable bitDepth is set equal to BitDepthy.
 The variable shift1 is set to equal to Max(2, 14−bitDepth).
 The variable shift2 is set to equal to Max(8, bitDepth−4).
 The variable shift3 is set to equal to Max(5, bitDepth−7).
 The variable shift4 is set equal to Max(3, 15−bitDepth) and the variable offset4 is set equal to 1<<(shift4−1).
 The variable mvRefineThres is set equal to Max(2, 1<<(13−bitDepth)).
For xIdx=0 . . . (nCbW>>2)−1 and yIdx=0 . . . (nCbH>>2)−1, the following applies:
 The variable xSb is set equal to (xIdx<<2)+1 and ySb is set equal to (yIdx<<2)+1.
 If bdofUtilizationFlag[xSbIdx][yIdx] is equal to FALSE, for x=xSb−1 . . . xSb+2, y=ySb−1 . . . ySb+2, the prediction sample values of the current subblock are derived as follows:

$$\text{pbSamples}[x][y]=\text{Clip3}(0,(2^{\text{bitDepth}})-1,(\text{predSamplesL0}[x+1][y+1]+\text{offset2}+\text{predSamplesL}[x+1][y+1])>>\text{shift2}) \quad (8\text{-}852)$$

Otherwise (bdofUtilizationFlag[xSbIdx][yIdx] is equal to TRUE), the prediction sample values of the current subblock are derived as follows:
For x=xSb−1 . . . xSb+4, y=ySb−1 . . . ySb+4, the following ordered steps apply:
7. The locations ($h_x$, $v_y$) for each of the corresponding sample locations (x, y) inside the prediction sample arrays are derived as follows:

$$h_x=\text{Clip3}(1,nCbW,x) \quad (8\text{-}853)$$

$$v_y=\text{Clip3}(1,nCbH,y) \quad (8\text{-}854)$$

8. The variables gradientHL0[x][y], gradientVL0[x][y], gradientHL1[x][y] and gradientVL1[x][y] are derived as follows:

$$\text{gradient}HL0[x][y]=(\text{predSamplesL0}[h_x+1][v_y]>>\text{shift1})-(\text{predSampleL0}[h_x-1][v_y]>>\text{shift1}) \quad (8\text{-}855)$$

$$\text{gradient}VL0[x][y]=(\text{predSampleL0}[h_x][v_y+1]>>\text{shift1})-(\text{predSample}_L0[h_x][v_y-1]>>\text{shift1}) \quad (8\text{-}856)$$

$$\text{gradient}HL1[x][y]=(\text{predSamplesL1}[h_x+1][v_y]>>\text{shift1})-(\text{predSampleL1}[h_x-1][v_y]>>\text{shift1}) \quad (8\text{-}857)$$

$$\text{gradient}VL1[x][y]=(\text{predSampleL1}[h_x][v_y+1]>>\text{shift1})-(\text{predSampleL1}[h_x][v_y-1]>>\text{shift1}) \quad (8\text{-}858)$$

9. The variables temp[x][y], tempH[x][y] and tempV[x][y] are derived as follows:

$$\text{diff}[x][y]=(\text{predSamplesL0}[h_x][v_y]>>\text{shift2})-(\text{predSamplesL1}[h_x][v_y]>>\text{shift2}) \quad (8\text{-}859)$$

$$\text{temp}H[x][y]=(\text{gradient}HL0[x][y]+\text{gradient}HL1[x][y])>>\text{shift3} \quad (8\text{-}860)$$

$$\text{temp}V[x][y]=(\text{gradient}VL0[x][y]+\text{gradient}VL1[x][y])>>\text{shift3} \quad (8\text{-}861)$$

The variables sGx2, sGy2, sGxGy, sGxdI and sGydI are derived as follows:

$$sGx2=\Sigma_i\Sigma_j(\text{temp}H[xSb+i][ySb+j]*\text{temp}H[xSb+i][ySb+j]) \text{ with } i,j=-1\ldots 4 \quad (8\text{-}862)$$

$$sGy2=\Sigma_i\Sigma_j(\text{temp}V[xSb+i][ySb+j]*\text{temp}V[xSb+i][ySb+j]) \text{ with } i,j=-1\ldots 4 \quad (8\text{-}863)$$

$$sGxGy=\Sigma_i\Sigma_j(\text{temp}H[xSb+i][ySb+j]*\text{temp}V[xSb+i][ySb+j]) \text{ with } i,j=-1\ldots 4 \quad (8\text{-}864)$$

$$sGxdI=\Sigma_i\Sigma_j(-\text{temp}H[xSb+i][ySb+j]*\text{diff}[xSb+i][ySb+j]) \text{ with } i,j=-1\ldots 4 \quad (8\text{-}865)$$

$$sGydI=\Sigma_i\Sigma_j(-\text{temp}V[xSb+i][ySb+j]*\text{diff}[xSb+i][ySb+j]) \text{ with } i,j=-1\ldots 4 \quad (8\text{-}866)$$

The horizontal and vertical motion offset of the current subblock are derived as:

$$v_x=sGx2>0?\text{Clip3}(-\text{mvRefineThres},\text{mvRefineThres},-(sGxdI<<3)>>\text{Floor}(\text{Log }2(sGx2))):0 \quad (8\text{-}867)$$

$$v_y=sGy2>0?\text{Clip3}(-\text{mvRefineThres},\text{mvRefineThres},((sGydI<<3)-((v_x*sGxGy_m)<<12+v_x*sGxGy_s)>>1)>>\text{Floor}(\text{Log }2(sGx2))):0 \quad (8\text{-}868)$$

For x=xSb−1 . . . xSb+2, y=ySb−1 . . . ySb+2, the prediction sample values of the current sub-block are derived as follows:

$$\text{bdofOffset}=\text{Round}((v_x*(\text{gradient}HL1[x+1][y+1]-\text{gradient}HL0[x+1][y+1]))>>1)+\text{Round}((v_y*(\text{gradient}VL1[x+1][y+1]-\text{gradient}VL0[x+1][y+1]))>>1) \quad (8\text{-}869)$$

[Ed. (JC): Round( ) operation is defined for float input. The Round( ) operation seems redundant here since the input is an integer value. To be confirmed by the proponent]

$$pbSamples[x][y]=Clip3(0,(2^{bitDepth})-1,(predSamplesL0[x+1][y+1]+offset4+predSamplesL1[x+1][y+1]+bdofOffset)>>shift4) \quad (8\text{-}870)$$

iii. One Example 8.5.7.4 Bidirectional Optical Flow Prediction Process
Inputs to this process are:
  two variables nCbW and nCbH specifying the width and the height of the current coding block.
  two (nCbW+2)×(nCbH+2) luma prediction sample arrays predSamplesL0 and predSamplesL1,
  the prediction list utilization flags predFlagL0 and predFlagL1,
  the reference indices refIdxL0 and refIdxL1,
  the bidirectional optical flow utilization flags bdofUtilizationFlag[xIdx][yIdx] with xIdx=0 . . . (nCbW>>2)−1, yIdx=0 . . . (nCbH>>2)−1.
Output of this process is the (nCbW)×(nCbH) array pbSamples of luma prediction sample values.
Variables bitDepth, shift1, shift2, shift3, shift4, offset4, ofset5, ofset6, and mvRefineThres are derived as follows:
  The variable bitDepth is set equal to BitDepthy.
  The variable shift1 is set to equal to Max(2, 14−bitDepth).
  The variable shift2 is set to equal to Max(8, bitDepth−4).
  The variable shift3 is set to equal to Max(5, bitDepth−7).
  The variable shift4 is set equal to Max(3, 15−bitDepth) and the variable offset4 is set equal to 1<<(shift4−1).
  The variable mvRefineThres is set equal to Max(2, 1<<(13−bitDepth)).
  The variable ofset5 is set equal to (1<<(shift1−1)).
  The variable ofset6 is set equal to (1<<(shift2−1)).
For xIdx=0 . . . (nCbW>>2)−1 and yIdx=0 . . . (nCbH>>2)−1, the following applies:
  The variable xSb is set equal to (xIdx<<2)+1 and ySb is set equal to (yIdx<<2)+1.
  If bdofUtilizationFlag[xSbIdx][yIdx] is equal to FALSE, for x=xSb−1 . . . xSb+2, y=ySb−1 . . . ySb+2, the prediction sample values of the current subblock are derived as follows:

$$pbSamples[x][y]=Clip3(0,(2^{bitDepth})-1,(predSamplesL0[x+1][y+1]+offset2+predSamplesL1[x+1][y+1])>>shift2) \quad (8\text{-}852)$$

Otherwise (bdofUtilizationFlag[xSbIdx][yIdx] is equal to TRUE), the prediction sample values of the current subblock are derived as follows:
  For x=xSb−1 . . . xSb+4, y=ySb−1 . . . ySb+4, the following ordered steps apply:
  10. The locations ($h_x$, $v_y$) for each of the corresponding sample locations (x, y) inside the prediction sample arrays are derived as follows:

$$h_x=Clip3(1,nCbW,x) \quad (8\text{-}853)$$

$$v_y=Clip3(1,nCbH,y) \quad (8\text{-}854)$$

11. The variables gradientHL0[x][y], gradientVL0[x][y], gradientHL1[x][y] and gradientVL1[x][y] are derived as follows:

$$gradientHL0[x][y]=(predSamplesL0[h_x+1][v_y]-predSampleL0[h_x-1][v_y]+ofset5)>>shift1 \quad (8\text{-}855)$$

$$gradientVL0[x][y]=(predSampleL0[h_x][v_y+1]-predSampleL0[h_x][v_y-1]+offset5)>>shift1 \quad (8\text{-}856)$$

$$gradientHL1[x][y]=(predSamplesL1[h_x+1][v_y]-predSampleL1[h_x-1][v_y]+offset5)>>shift1 \quad (8\text{-}857)$$

$$gradientVL1[x][y]=(predSampleL1[h_x][v_y+1]-predSampleL1[h_x][v_y-1]+offset5)>>shift1 \quad (8\text{-}858)$$

12. The variables temp[x][y], tempH[x][y] and tempV[x][y] are derived as follows:

$$diff[x][y]=(predSamplesL0[h][v_y]-predSamplesL1[h][v_y]+ofset6)>>shift2 \quad (8\text{-}859)$$

$$tempH[x][y]=(gradientHL0[x][y]+gradientHL1[x][y])>>shift3 \quad (8\text{-}860)$$

$$tempV[x][y]=(gradientVL0[x][y]+gradientVL1[x][y])>>shift3 \quad (8\text{-}861)$$

The variables sGx2, sGy2, sGxGy, sGxdI and sGydI are derived as follows:

$$sGx2=\Sigma_i\Sigma_j(tempH[xSb+i][ySb+j]*tempH[xSb+i][ySb+j]) \text{ with } i,j=-1 \ldots 4 \quad (8\text{-}862)$$

$$sGy2=\Sigma_i\Sigma_j(tempV[xSb+i][ySb+j]*tempV[xSb+i][ySb+j]) \text{ with } i,j=-1 \ldots 4 \quad (8\text{-}863)$$

$$sGxGy=\Sigma_i\Sigma_j(tempH[xSb+i][ySb+j]*tempV[xSb+i][ySb+j]) \text{ with } i,j=-1 \ldots 4 \quad (8\text{-}864)$$

$$sGxdI=\Sigma_i\Sigma_j(-tempH[xSb+i][ySb+j]*diff[xSb+i][ySb+j]) \text{ with } i,j=-1 \ldots 4 \quad (8\text{-}865)$$

$$sGydI=\Sigma_i\Sigma_j(-tempV[xSb+i][ySb+j]*diff[xSb+i][ySb+j]) \text{ with } i,j=-1 \ldots 4 \quad (8\text{-}866)$$

The horizontal and vertical motion offset of the current subblock are derived as:

$$v_x=sGx2>0?Clip3(-mvRefineThres, mvRefineThres,-(sGxdI<<3)>>Floor(Log\ 2(sGx2))):0 \quad (8\text{-}867)$$

$$v_y=sGy2>0?Clip3(-mvRefineThres, mvRefineThres,((sGydI<<3)-((v_x*sGxGy_m)<<12+v_x*sGxGy_s)>>1)>>Floor(Log\ 2(sGx2))):0 \quad (8\text{-}868)$$

For x=xSb−1 . . . xSb+2, y=ySb−1 . . . ySb+2, the prediction sample values of the current sub-block are derived as follows:

$$bdofOffset=Round((v_x*(gradientHL1[x+1][y+1]-gradientHL0[x+1][y+1]))>>1)+Round((v_y*(gradientVL1[x+1][y+1]-gradientVL0[x+1][y+1]))>>1) \quad (8\text{-}869)$$

[Ed. (JC): Round( ) operation is defined for float input. The Round( ) operation seems redundant here since the input is an integer value. To be confirmed by the proponent]

$$pbSamples[x][y]=Clip3(0,(2^{bitDepth})-1,(predSamplesL0[x+1][y+1]+offset4+predSamplesL1[x+1][y+1]+bdofOffset)>>shift4) \quad (8\text{-}870)$$

Figure 8:
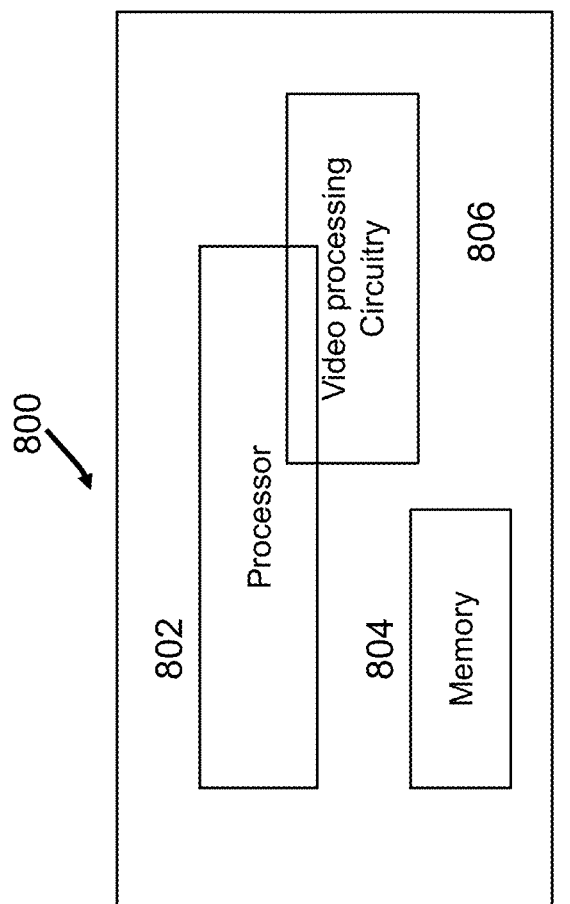
FIG. 8 is a block diagram of an example of a video processing apparatus.

FIG. 8 is a block diagram of a video processing apparatus 800. The apparatus 800 may be used to implement one or more of the methods described herein. The apparatus 800 may be embodied in a smartphone, tablet, computer, Internet of Things (IoT) receiver, and so on. The apparatus 800 may include one or more processors 802, one or more memories 804 and video processing hardware 806. The processor(s) 802 may be configured to implement one or more methods described in the present document. The memory (memories) 804 may be used for storing data and code used for implementing the methods and techniques described herein. The video processing hardware 806 may be used to implement, in hardware circuitry, some techniques described in the present document. The video processing hardware 806 may be partially or completely includes within the processor(s)

802 in the form of dedicated hardware, or graphical processor unit (GPU) or specialized signal processing blocks.

Figure 10:
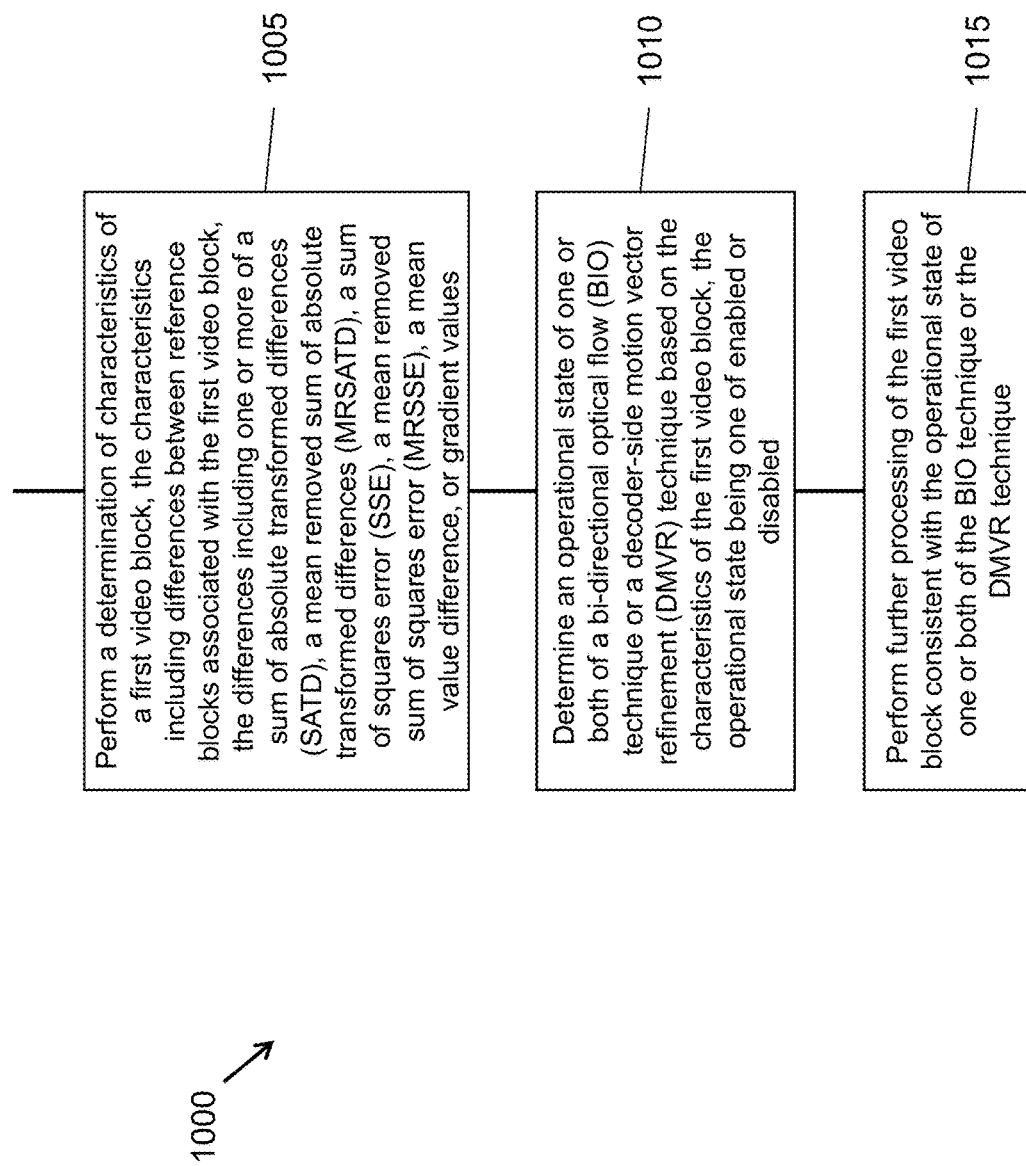
FIG. 10 is a flowchart for an example of a video processing method.

FIG. 10 is a flowchart for a method 1000 of processing a video. The method 1000 includes performing a determination (1005) of characteristics of a first video block, the characteristics including differences between reference blocks associated with the first video block, the differences including one or more of a sum of absolute transformed differences (SATD), a mean removed sum of absolute transformed differences (MRSATD), a sum of squares error (SSE), a mean removed sum of squares error (MRSSE), a mean value difference, or gradient values, determining (1010) an operational state of one or both of a bi-directional optical flow (BIO) technique or a decoder-side motion vector refinement (DMVR) technique based on the characteristics of the first video block, the operational state being one of enabled or disabled, and performing (1015) further processing of the first video block consistent with the operational state of one or both of the BIO technique or the DMVR technique.

Figure 11:
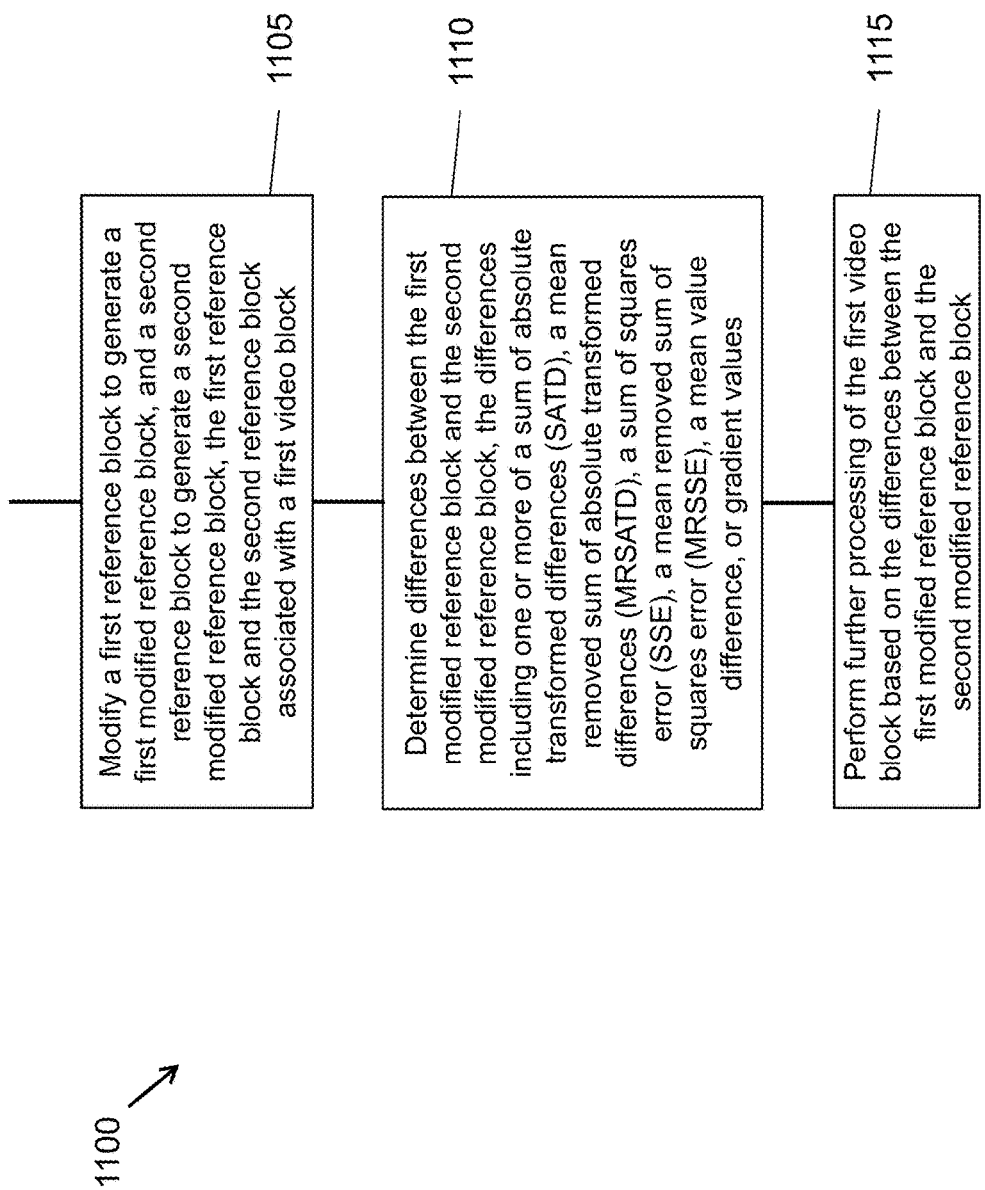
FIG. 11 is a flowchart for an example of a video processing method.

FIG. 11 is a flowchart for a method 1100 of processing a video. The method 1100 includes modifying (1105) a first reference block to generate a first modified reference block, and a second reference block to generate a second modified reference block, the first reference block and the second reference block associated with a first video block, performing (1110) differences between the first modified reference block and the second modified reference block, the differences including one or more of a sum of absolute transformed differences (SATD), a mean removed sum of absolute transformed differences (MRSATD), a sum of squares error (SSE), a mean removed sum of squares error (MRSSE), a mean value difference, or gradient values, and performing (1115) further processing of the first video block based on the differences between the first modified reference block and the second modified reference block.

Figure 12:
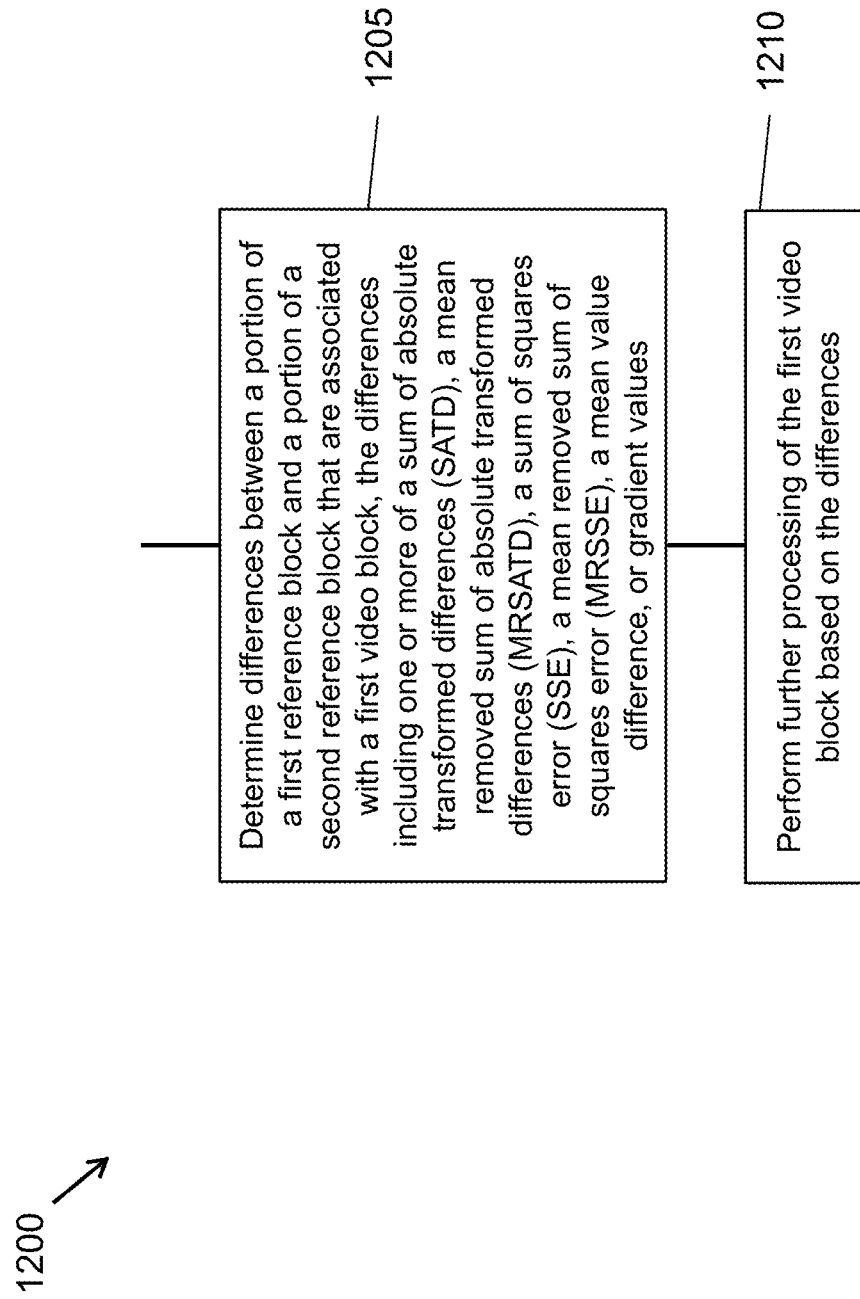
FIG. 12 is a flowchart for an example of a video processing method.

FIG. 12 is a flowchart for a method 1200 of processing a video. The method 1200 includes determining (1205) differences between a portion of a first reference block and a portion of a second reference block that are associated with a first video block, the differences including one or more of a sum of absolute transformed differences (SATD), a mean removed sum of absolute transformed differences (MRSATD), a sum of squares error (SSE), a mean removed sum of squares error (MRSSE), a mean value difference, or gradient values, and performing (1210) further processing of the first video block based on the differences.

Figure 13:
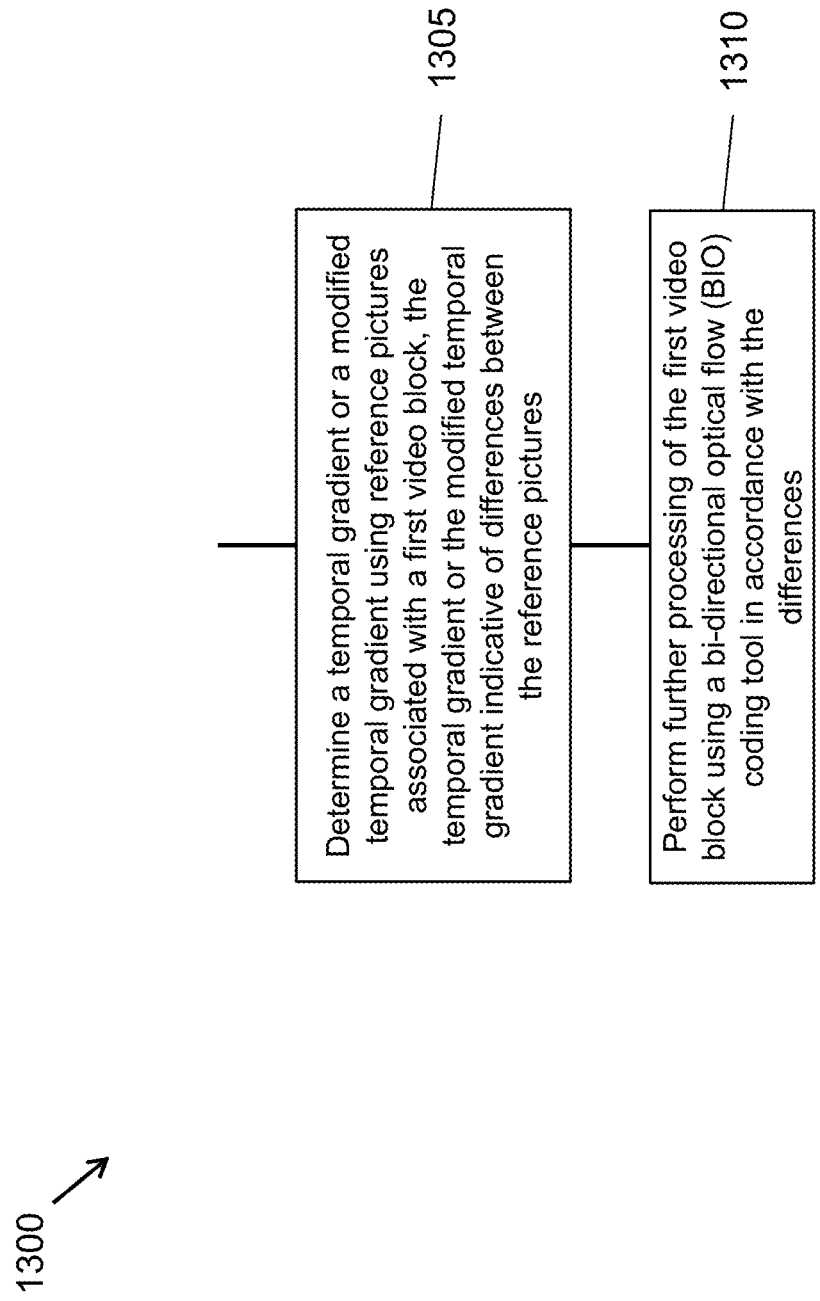
FIG. 13 is a flowchart for an example of a video processing method.

FIG. 13 is a flowchart for a method 1300 of processing a video. The method 1300 includes determining (1305) a temporal gradient or a modified temporal gradient using reference pictures associated with a first video block, the temporal gradient or the modified temporal gradient indicative of differences between the reference pictures, and performing (1310) further processing of the first video block using a bi-directional optical flow (BIO) coding tool in accordance with the differences.

Figure 14:
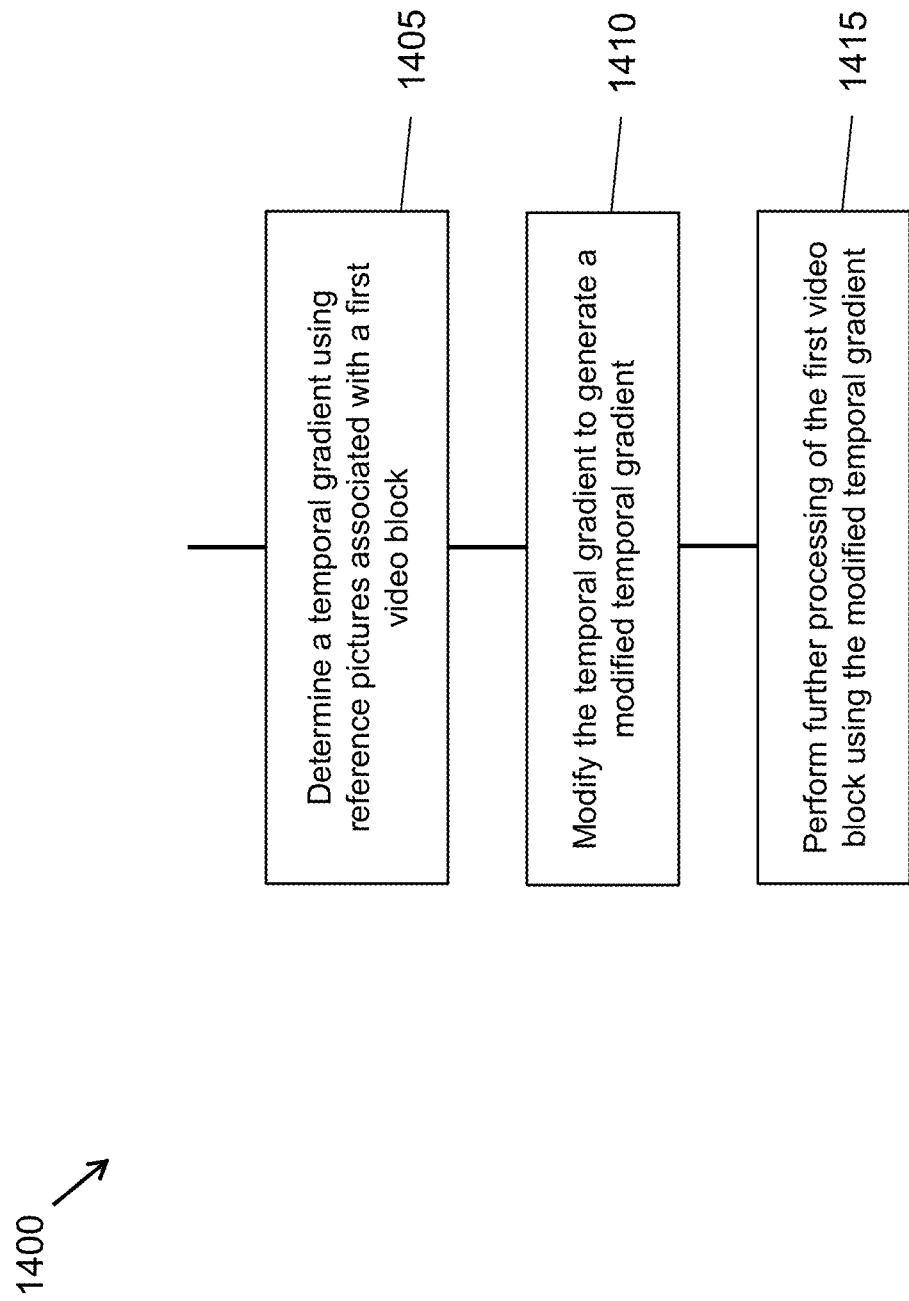
FIG. 14 is a flowchart for an example of a video processing method.

FIG. 14 is a flowchart for a method 1400 of processing a video. The method 1400 includes determining (1405) a temporal gradient using reference pictures associated with a first video block, modifying (1410) the temporal gradient to generate a modified temporal gradient, and performing (1415) further processing of the first video block using the modified temporal gradient.

Figure 15:
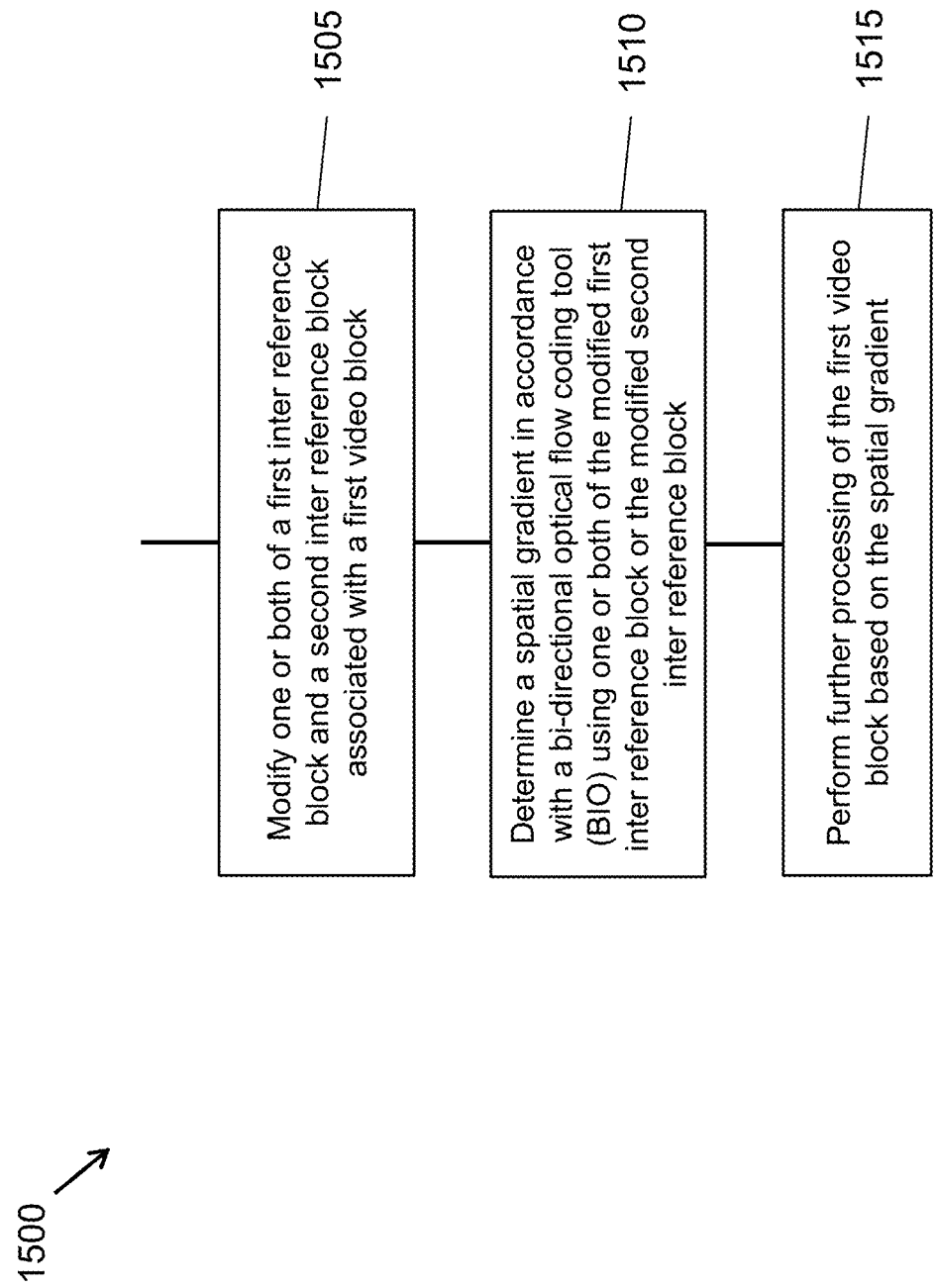
FIG. 15 is a flowchart for an example of a video processing method.

FIG. 15 is a flowchart for a method 1500 of processing a video. The method 1500 includes modifying (1505) one or both of a first inter reference block and a second inter reference block associated with a first video block, determining (1510) a spatial gradient in accordance with a bi-directional optical flow coding tool (BIO) using one or both of the modified first inter reference block or the modified second inter reference block, and performing (1515) further processing of the first video block based on the spatial gradient.

Figure 16:
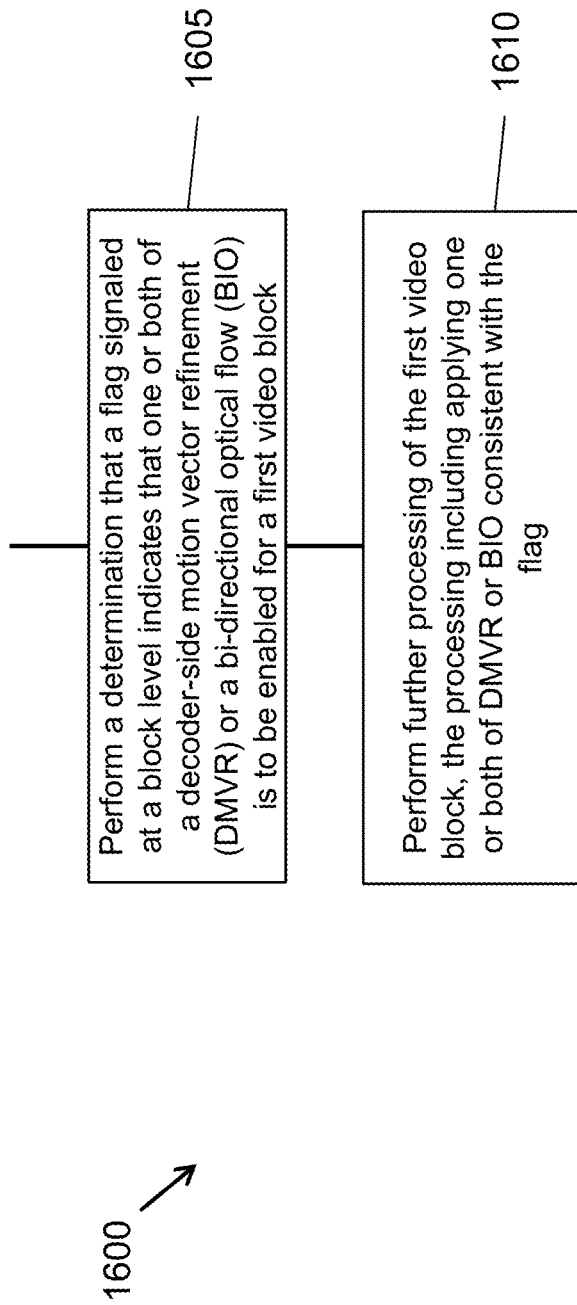
FIG. 16 is a flowchart for an example of a video processing method.

FIG. 16 is a flowchart for a method 1600 of processing a video. The method 1600 includes performing (1605) a determination that a flag signaled at a block level indicates that one or both of a decoder-side motion vector refinement (DMVR) or a bi-directional optical flow (BIO) is to be enabled for a first video block, and performing (1610) further processing of the first video block, the processing including applying one or both of DMVR or BIO consistent with the flag.

With reference to methods 1000, 1100, 1200, 1300, 1400, 1500, and 1600, some examples of determining use of bi-directional optical flow (BIO) or decoder-side motion vector refinement (DMVR) are described in Section 4 of the present document. For example, as described in Section 4, differences between reference blocks can be determined and the differences can be used to enable or disable BIO or DMVR.

With reference to methods 1000, 1100, 1200, 1300, 1400, 1500, and 1600, a video block may be encoded in the video bitstream in which bit efficiency may be achieved by using a bitstream generation rule related to motion information prediction.

The methods can include wherein the operational state of the BIO technique or the DMVR technique is different between a block-level and a sub-block level.

The methods can include determining that one or more of the gradient values, an average of the gradient values, or a range of the gradient values are within a threshold range, wherein determining the operational state is based on the determination the gradient values, the average of the gradient values, or the range of the gradient values are within the threshold range.

The methods can include wherein determining the operational state is further based on information signaled from an encoder to a decoder in a video parameter set (VPS), a sequence parameter set (SPS), a picture parameter set (PPS), a tile group header, or a slice header.

The methods can include determining a refined motion vector of the first video block based on the SATD, MRSATD, SSE, or MRSSE, and wherein performing further processing is based on the refined motion vector.

The methods can include wherein determining the refined motion vector is based on SATD or MRSATD, the method further comprising: determining SATD or MRSATD for each sub-block of the first video block; and generating SATD or MRSATD for the first video block based on a summation of the SATD or MRSATD for each sub-block, wherein further processing of the first video block is based on the generated SATD or MRSATD.

The methods can include determining that a mean value difference of two reference blocks of the first video block is larger than a threshold value, and wherein one or both of BIO or DMVR is in a disabled operational state based on the mean value difference of the two reference blocks.

The methods can include determining that a mean value difference of two reference sub-blocks of a sub-block of the first video block is larger than a threshold value, and wherein one or both of BIO or DMVR is in a disabled operational state based on the mean value difference of the two reference sub-blocks.

The methods can include wherein the threshold value is pre-defined.

The methods can include determining dimensions of the first video block, and wherein the threshold value is based on the dimensions of the first video block.

The methods can include wherein modifying the first reference block and the second reference block includes subtracting a mean of the first reference block from the first reference block.

The methods can include wherein the portions of the first reference block and the second reference block include even rows.

The methods can include wherein the portions of the first reference block and the second reference block include corner samples.

The methods can include wherein the portions of the first reference block and the second reference block include representative sub-blocks.

The methods can include wherein differences between the representative sub-blocks are summed to generate a difference for the first reference block or the second reference block.

The methods can include wherein the differences are related to an absolute sum of the temporal gradient.

The methods can include wherein modifying the temporal gradient is based on an absolute mean difference between the reference blocks being greater than a threshold value.

The methods can include wherein the threshold value is 4.

The methods can include wherein modifying the temporal gradient is based on an absolute mean difference between the reference blocks being less than a threshold value.

The methods can include wherein the threshold value is 20.

The methods can include wherein modifying the temporal gradient is based on an absolute mean difference between the reference blocks being within a threshold range.

The methods can include wherein BIO is in a disabled operational state based on the absolute mean difference being greater than a threshold value.

The methods can include wherein the threshold value or the threshold range is indicated in VPS, SPS, PPS, a picture, a slice, or a tile level.

The methods can include wherein the threshold value or the threshold range is different for different coding units (CUs), largest coding units (LCUs), slices, tiles, or pictures.

The methods can include wherein the threshold value or the threshold range is based on a decoded or encoded pixel value.

The methods can include wherein the threshold value or the threshold range is based on a reference picture.

The methods can include wherein determining the spatial gradient includes determining a weighted average of an intra prediction block and an inter prediction block in each prediction direction.

The methods can include wherein the flag is provided in advanced motion vector prediction (AMVP) mode, and in merge mode the flag is inherited from one or both of spatial neighboring blocks or temporal neighboring blocks.

The methods can include wherein the flag is not signaled for uni-predicted blocks.

The methods can include wherein the flag is not signaled for bi-predicted blocks with reference pictures that are preceding pictures or following pictures in display order.

The methods can include wherein the flag is not signaled for bi-predicted blocks.

The methods can include wherein the flag is not signaled for intra coded blocks.

The methods can include wherein the flag is not signaled for blocks coded with hybrid intra and inter prediction mode.

The methods can include wherein the flag is signaled based on a dimension of the first video block.

The methods can include wherein the flag is signaled in a VPS, a SPS, or a PPS.

The methods can include wherein the flag is based on a temporal layer of a picture associated with the first video block.

The methods can include wherein the flag is based on a quantization parameter (QP) of a picture associated with the first video block.

Figure 17:
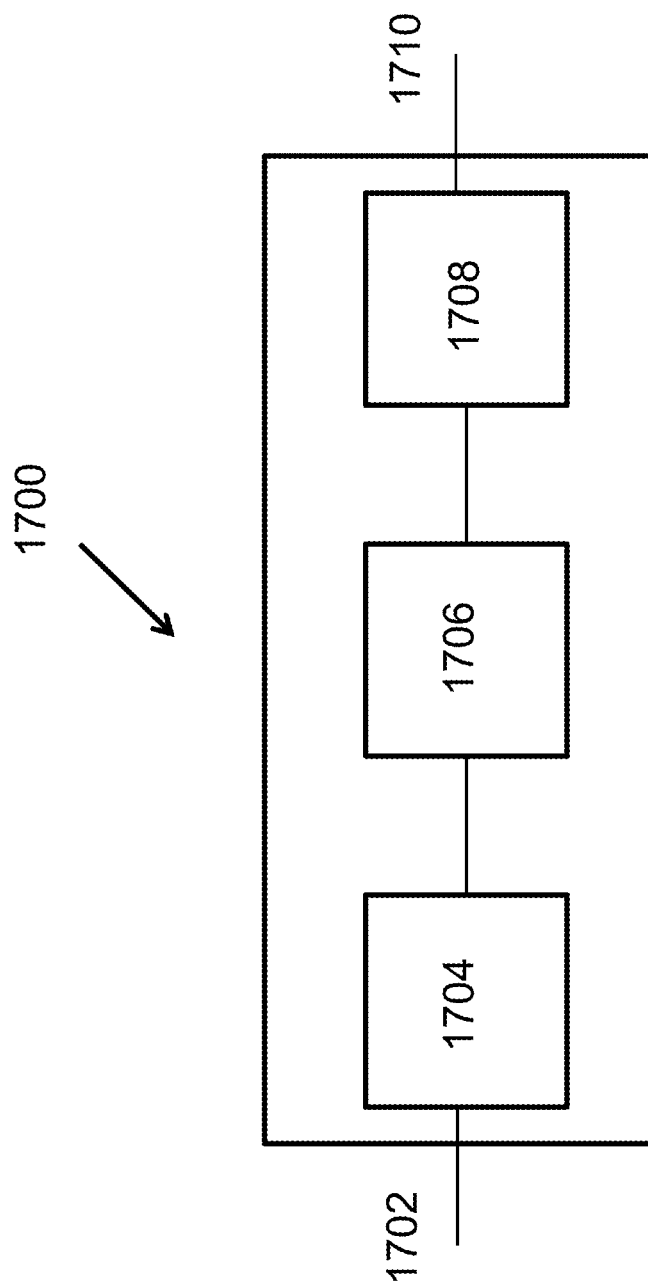
FIG. 17 is a block diagram of an example video processing system in which disclosed techniques may be implemented.

FIG. 17 is a block diagram showing an example video processing system 1700 in which various techniques disclosed herein may be implemented. Various implementations may include some or all of the components of the system 1700. The system 1700 may include input 1702 for receiving video content. The video content may be received in a raw or uncompressed format, e.g., 8 or 10 bit multi-component pixel values, or may be in a compressed or encoded format. The input 1702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1700 may include a coding component 1704 that may implement the various coding or encoding methods described in the present document. The coding component 1704 may reduce the average bitrate of video from the input 1702 to the output of the coding component 1704 to produce a coded representation of the video. The coding techniques are therefore sometimes called video compression or video transcoding techniques. The output of the coding component 1704 may be either stored, or transmitted via a communication connected, as represented by the component 1706. The stored or communicated bitstream (or coded) representation of the video received at the input 1702 may be used by the component 1708 for generating pixel values or displayable video that is sent to a display interface 1710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

It will be appreciated that the disclosed techniques may be embodied in video encoders or decoders to improve compression efficiency when the coding units being compressed have shaped that are significantly different than the traditional square shaped blocks or rectangular blocks that are half-square shaped. For example, new coding tools that use long or tall coding units such as 4×32 or 32×4 sized units may benefit from the disclosed techniques.

In some implementations, a method of video processing may be performed as follows:

using, during a conversion between a video block and a bitstream representation of the video block, a filtering method for calculating a spatial gradient and a temporal gradient, and performing the conversion using the filtering.

Here, the conversion includes generating the bitstream representation from pixel values of the video block or generating the pixels values from the bitstream representation.

In some embodiments, the spatial and temporal gradients are calculated using shifted sample differences.

In some embodiments, the spatial and temporal gradients are calculated using modified samples.

Additional details of this method are provided in item 1 discussed in Section 4.

Figure 18:
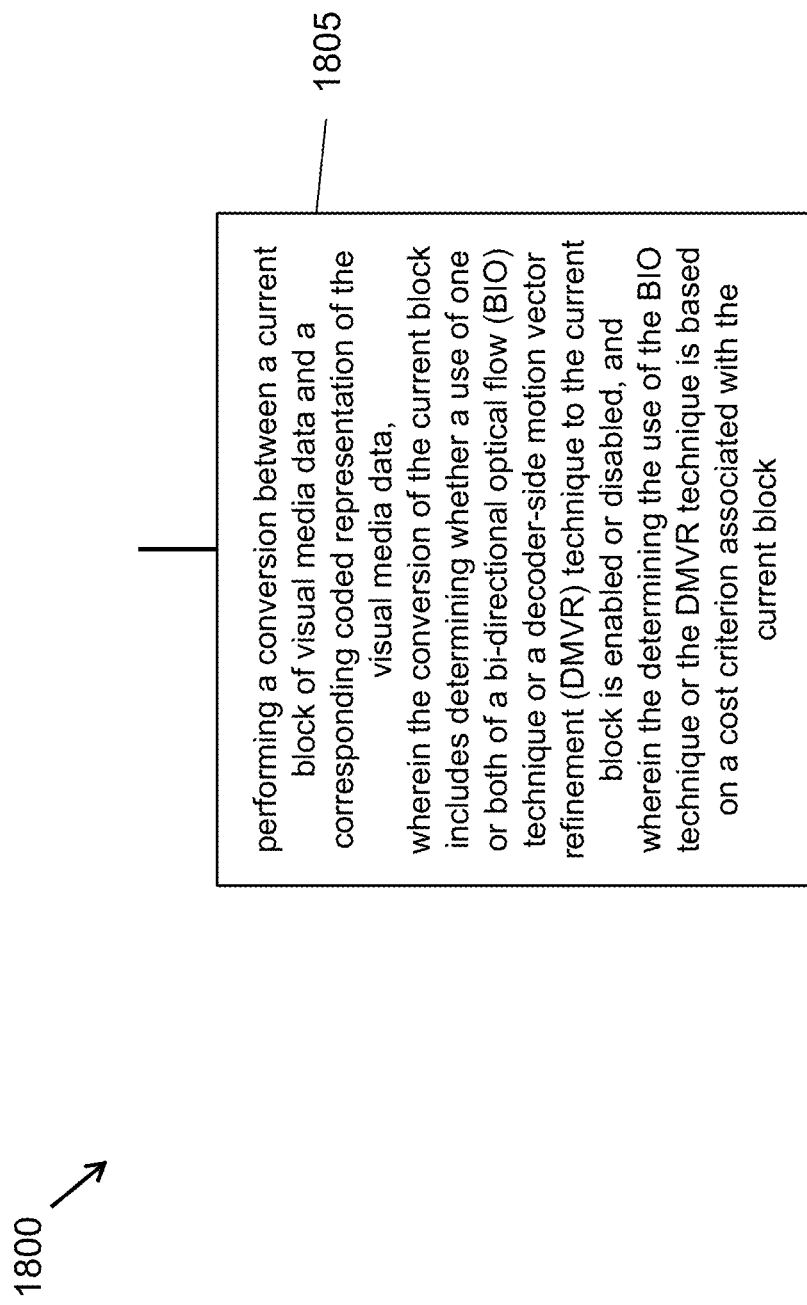
FIG. 18 is a flowchart for an example of a video processing method.

FIG. 18 is a flowchart for an example of a video processing method. Steps of this method are discussed in example 2 of Section 4 of this document. The method includes (at step 1805) performing a conversion between a current block of visual media data and a corresponding coded representation of the visual media data, wherein the conversion of the current block includes determining whether a use of one or both of a bi-directional optical flow (BIO) technique or a decoder-side motion vector refinement (DMVR) technique to the current block is enabled or disabled, and wherein the determining the use of the BIO technique or the DMVR technique is based on a cost criterion associated with the current block.

Figure 19:
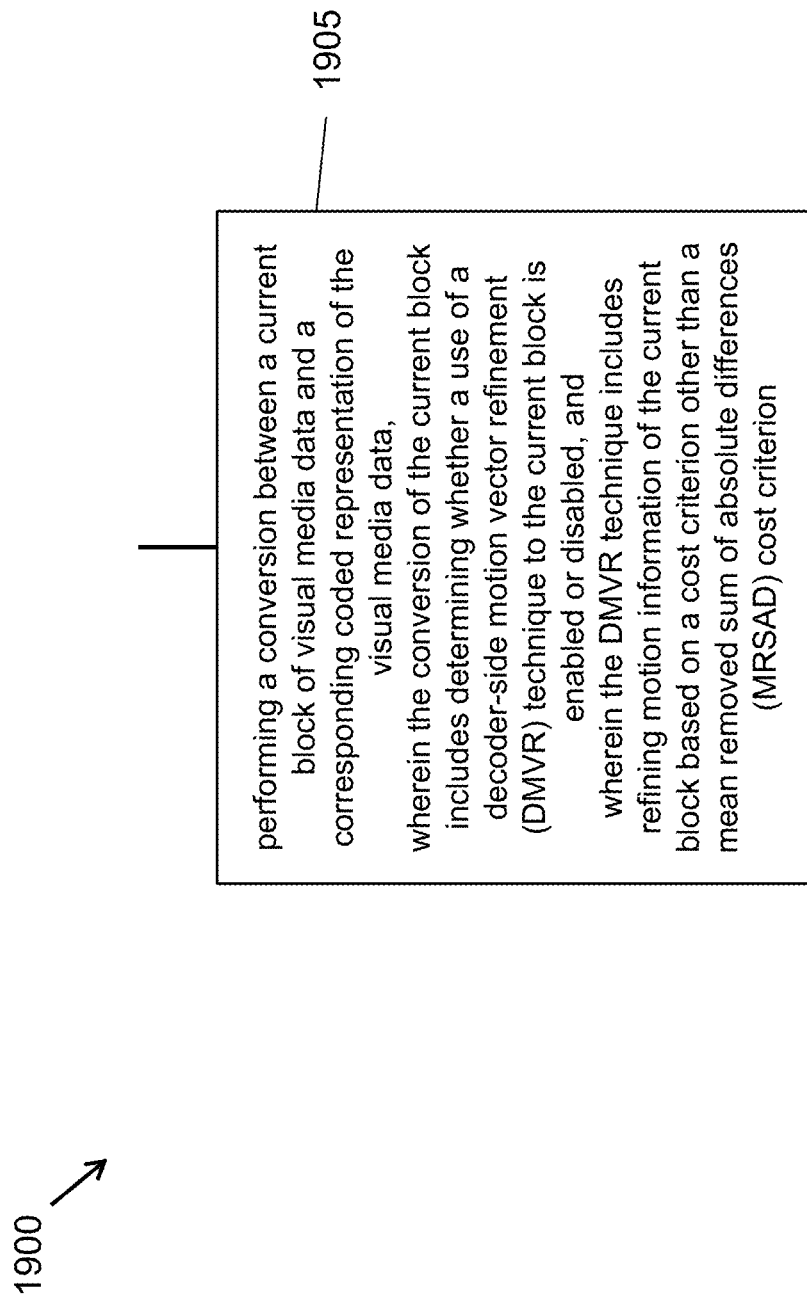
FIG. 19 is a flowchart for an example of a video processing method.

FIG. 19 is a flowchart for an example of a video processing method. Steps of this method are discussed in example 3 of Section 4 of this document. The method includes (at step 1905) performing a conversion between a current block of visual media data and a corresponding coded representation of the visual media data, wherein the conversion of the current block includes determining whether a use of a decoder-side motion vector refinement (DMVR) technique to the current block is enabled or disabled, and wherein the DMVR technique includes refining motion information of the current block based on a cost criterion other than a mean removed sum of absolute differences (MRSAD) cost criterion.

FIG. 20 is a flowchart for an example of a video processing method. Steps of this method are discussed in example 4 of Section 4 of this document. The method includes (at step 2005) performing a conversion between a current block of visual media data and a corresponding coded representation of the visual media data, wherein the conversion of the current block includes determining whether a use of one or both of a bi-directional optical flow (BIO) technique or a decoder-side motion vector refinement (DMVR) technique to the current block is enabled or disabled, and wherein the determining the use of the BIO technique or the DMVR technique is based on computing that a mean value difference of a pair of reference blocks associated with the current block exceeds a threshold value.

Figure 21:
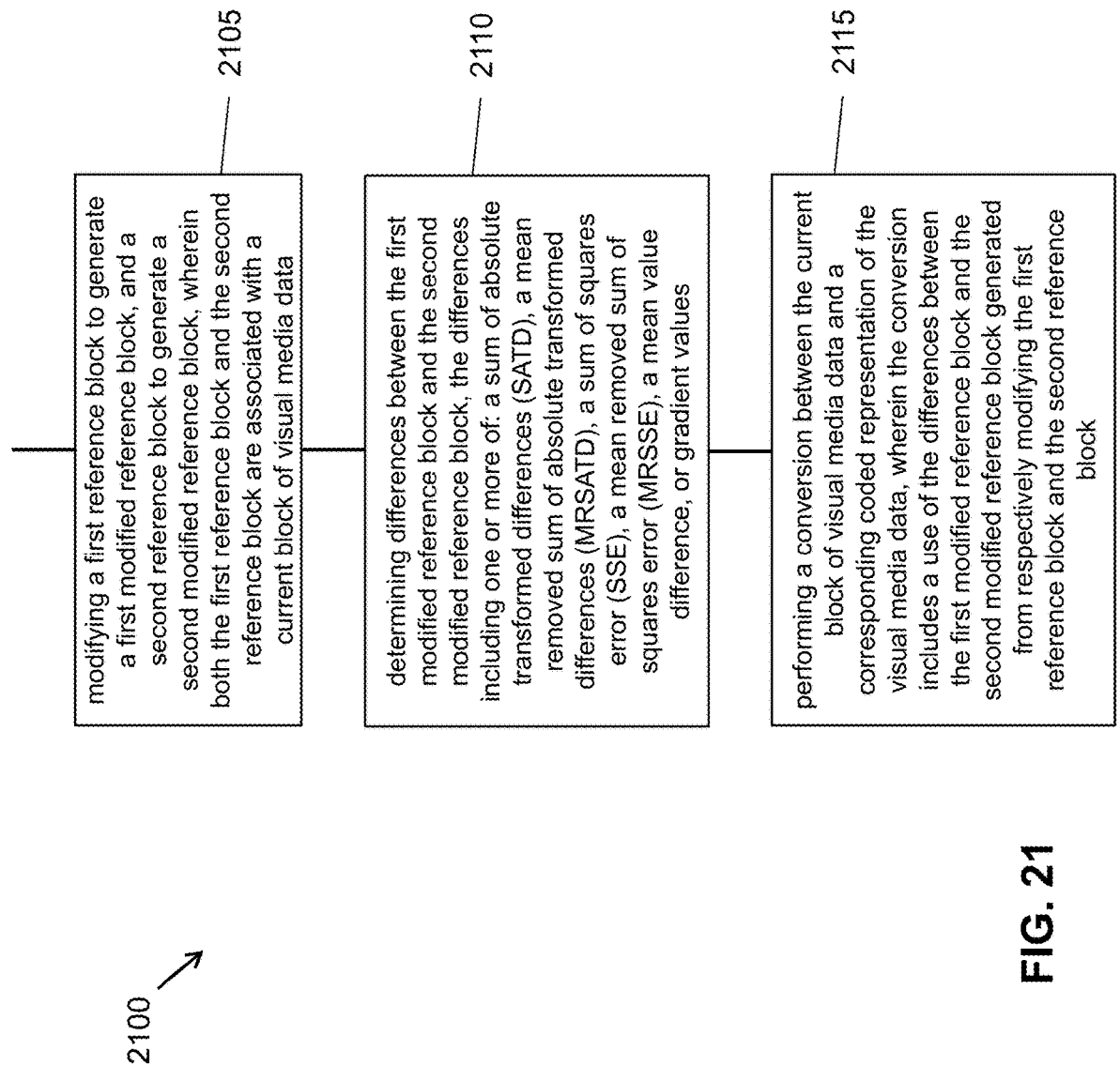
FIG. 21 is a flowchart for an example of a video processing method.

FIG. 21 is a flowchart for an example of a video processing method. Steps of this method are discussed in example 6 of Section 4 of this document. The method includes (at step 2105) modifying a first reference block to generate a first modified reference block, and a second reference block to generate a second modified reference block, wherein both the first reference block and the second reference block are associated with a current block of visual media data. The method further includes (at step 2110) determining differences between the first modified reference block and the second modified reference block, the differences including one or more of: a sum of absolute transformed differences (SATD), a mean removed sum of absolute transformed differences (MRSATD), a sum of squares error (SSE), a mean removed sum of squares error (MRSSE), a mean value difference, or gradient values. The method includes (at step 2115) performing a conversion between the current block of visual media data and a corresponding coded representation of the visual media data, wherein the conversion includes a use of the differences between the first modified reference block and the second modified reference block generated from respectively modifying the first reference block and the second reference block.

Figure 22:
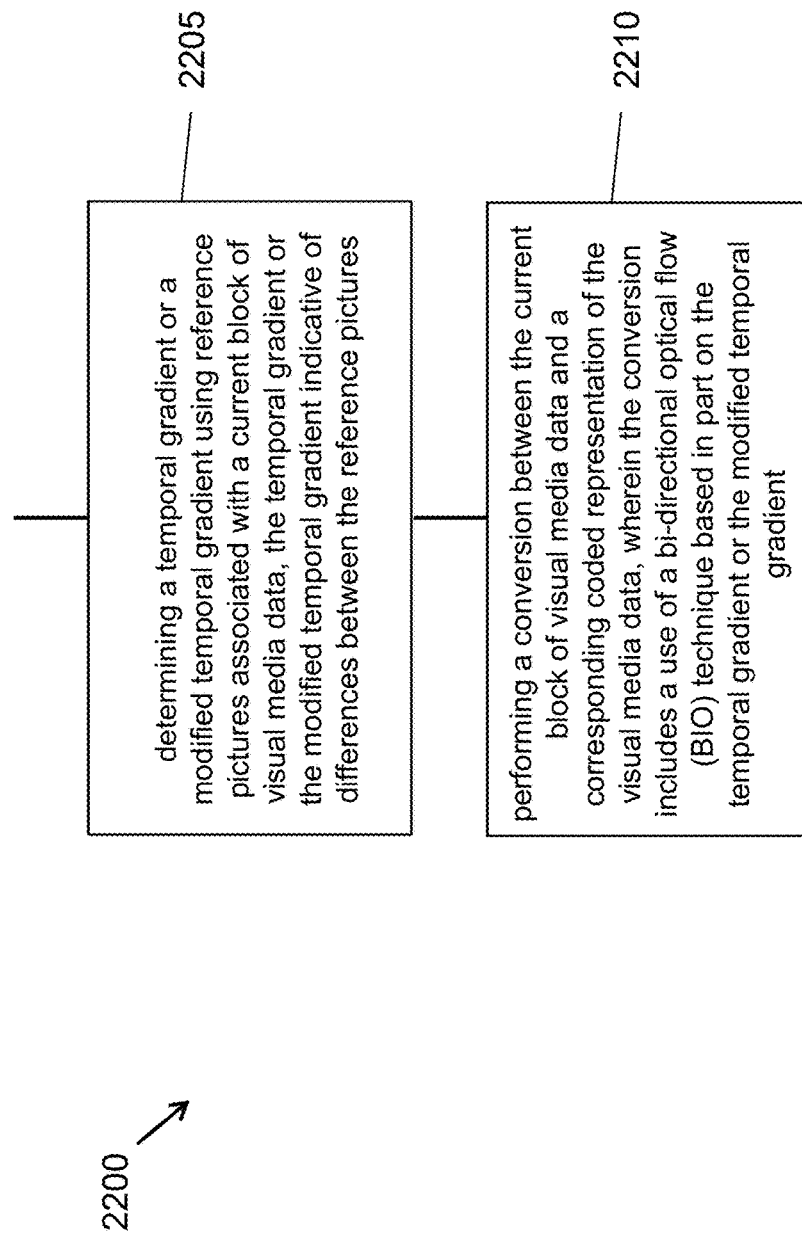
FIG. 22 is a flowchart for an example of a video processing method.

FIG. 22 is a flowchart for an example of a video processing method. Steps of this method are discussed in example 7 of Section 4 of this document. The method includes (at step 2205) determining a temporal gradient or a modified temporal gradient using reference pictures associated with a current block of visual media data, the temporal gradient or the modified temporal gradient indicative of differences between the reference pictures. The method includes (at step 2210) performing a conversion between the current block of visual media data and a corresponding coded representation of the visual media data, wherein the conversion includes a use of a bi-directional optical flow (BIO) technique based in part on the temporal gradient or the modified temporal gradient.

Figure 23:
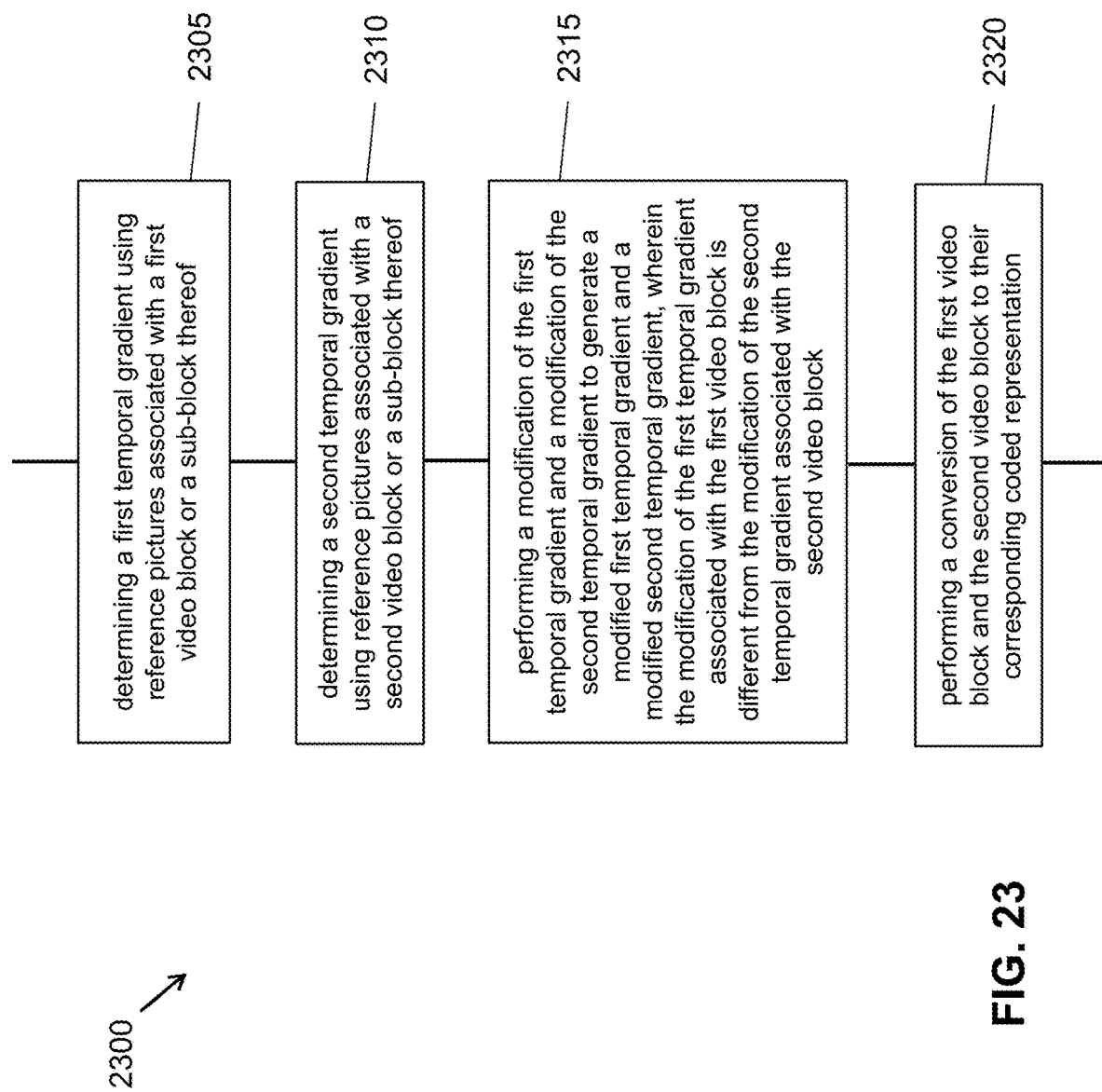
FIG. 23 is a flowchart for an example of a video processing method.

FIG. 23 is a flowchart for an example of a video processing method. Steps of this method are discussed in example 8 of Section 4 of this document. The method includes (at step 2305) determining a first temporal gradient using reference pictures associated with a first video block or a sub-block thereof. The method includes (at step 2310) determining a second temporal gradient using reference pictures associated with a second video block or a sub-block thereof. The method includes (at step 2315) performing a modification of the first temporal gradient and a modification of the second temporal gradient to generate a modified first temporal gradient and a modified second temporal gradient, wherein the modification of the first temporal gradient associated with the first video block is different from the modification of the second temporal gradient associated with the second video block. The method includes (at step 2320) performing a conversion of the first video block and the second video block to their corresponding coded representation.

Figure 24:
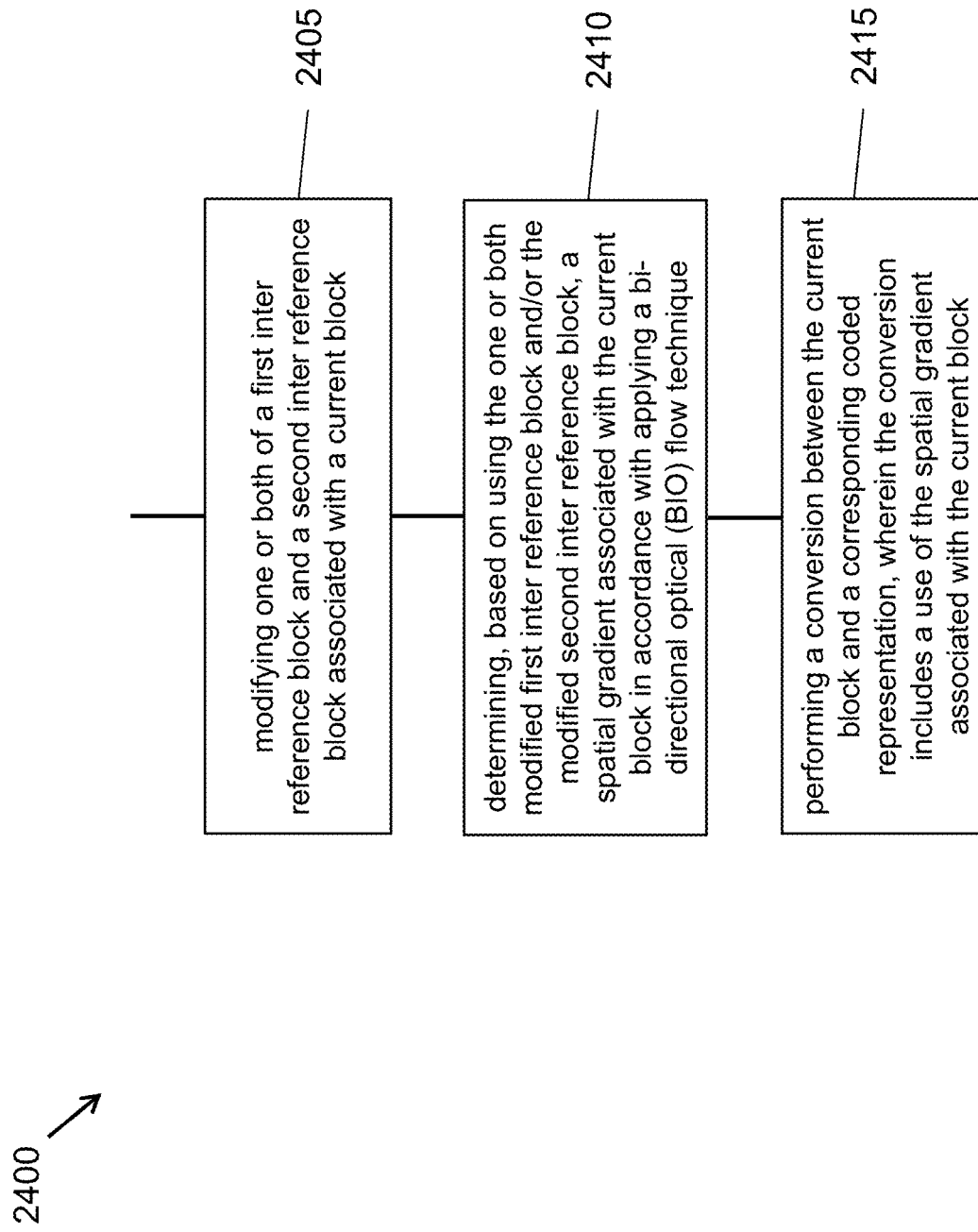
FIG. 24 is a flowchart for an example of a video processing method.

FIG. 24 is a flowchart for an example of a video processing method. Steps of this method are discussed in example 9 of Section 4 of this document. The method includes (at step 2405) modifying one or both of a first inter reference block and a second inter reference block associated with a current block. The method includes (at step 2410) determining, based on using the one or both modified first inter reference block and/or the modified second inter reference block, a spatial gradient associated with the current block in accordance with applying a bi-directional optical (BIO) flow technique. The method includes (at step 2415) performing a conversion between the current block and a corresponding coded representation, wherein the conversion includes a use of the spatial gradient associated with the current block.

Figure 25:
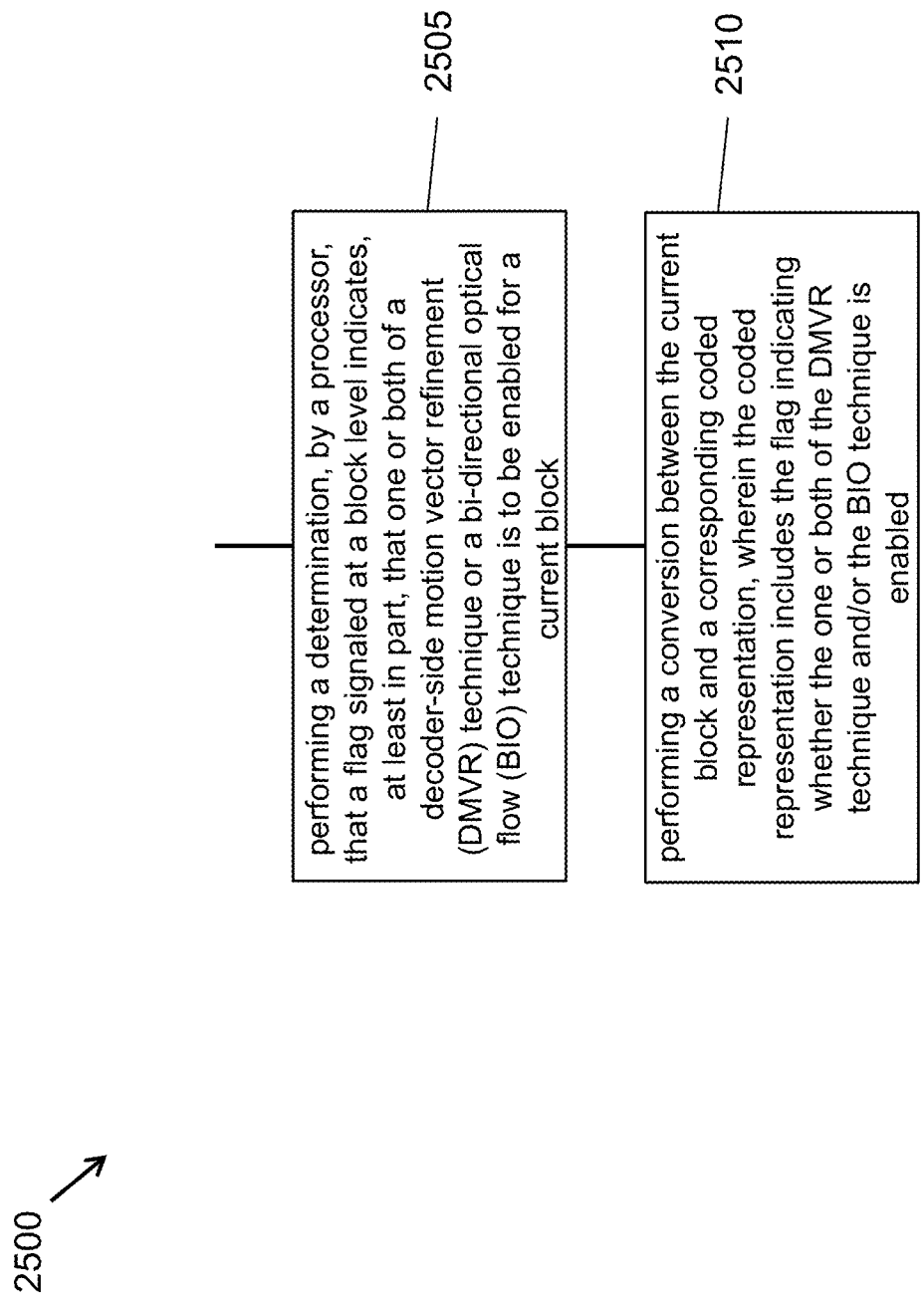
FIG. 25 is a flowchart for an example of a video processing method.

FIG. 25 is a flowchart for an example of a video processing method. Steps of this method are discussed in example 10 of Section 4 of this document. The method includes (at step 2505) performing a determination, by a processor, that a flag signaled at a block level indicates, at least in part, that one or both of a decoder-side motion vector refinement (DMVR) technique or a bi-directional optical flow (BIO) technique is to be enabled for a current block. The method includes (at step 2510) performing a conversion between the current block and a corresponding coded representation, wherein the coded representation includes the flag indicating whether the one or both of the DMVR technique and/or the BIO technique is enabled.

Figure 26:
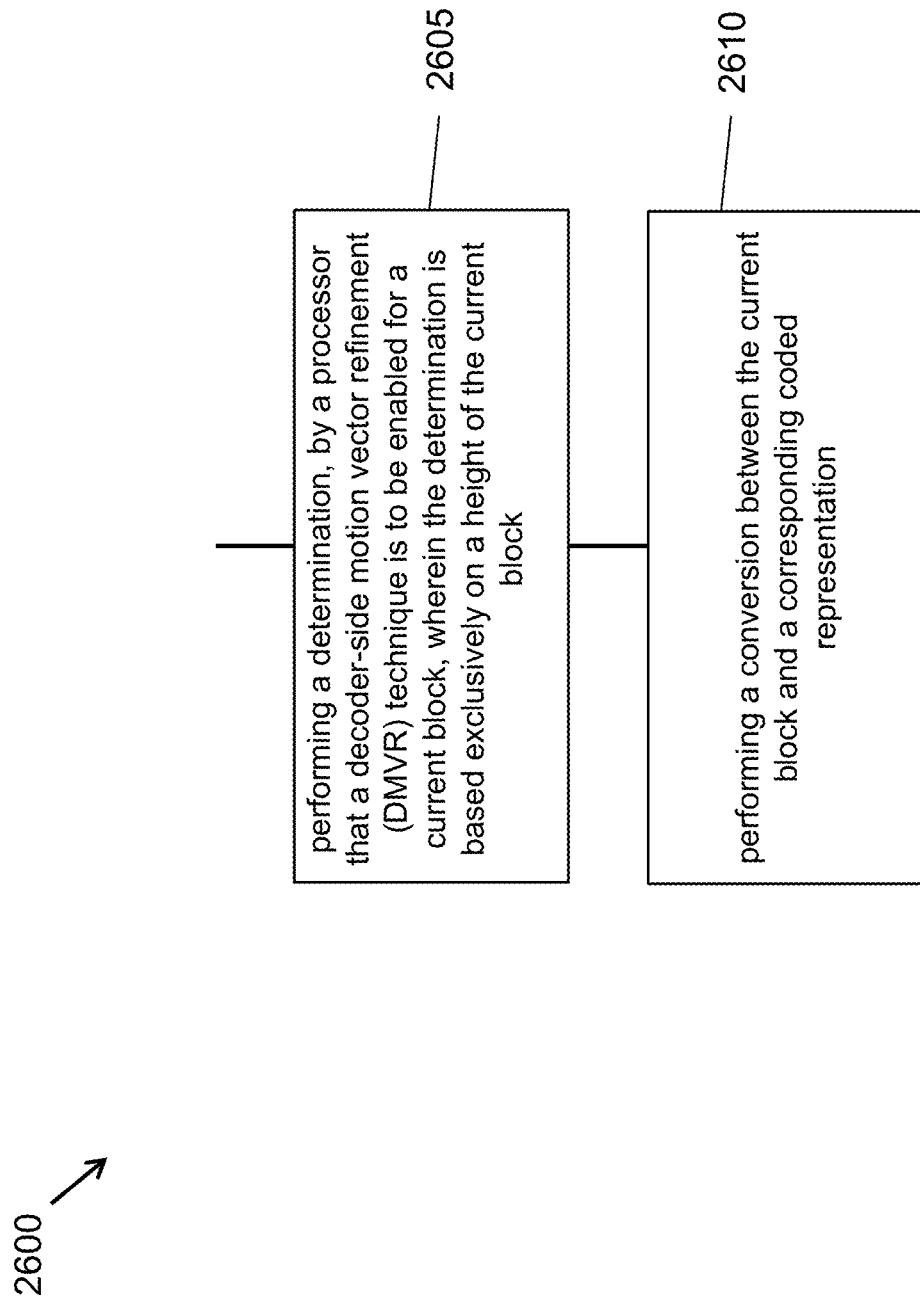
FIG. 26 is a flowchart for an example of a video processing method.

FIG. 26 is a flowchart for an example of a video processing method. Steps of this method are discussed in example 11 of Section 4 of this document. The method includes (at step 2605) performing a determination, by a processor that a decoder-side motion vector refinement (DMVR) technique is to be enabled for a current block, wherein the determination is based exclusively on a height of the current block. The method includes (at step 2610) performing a conversion between the current block and a corresponding coded representation.

Figure 27:
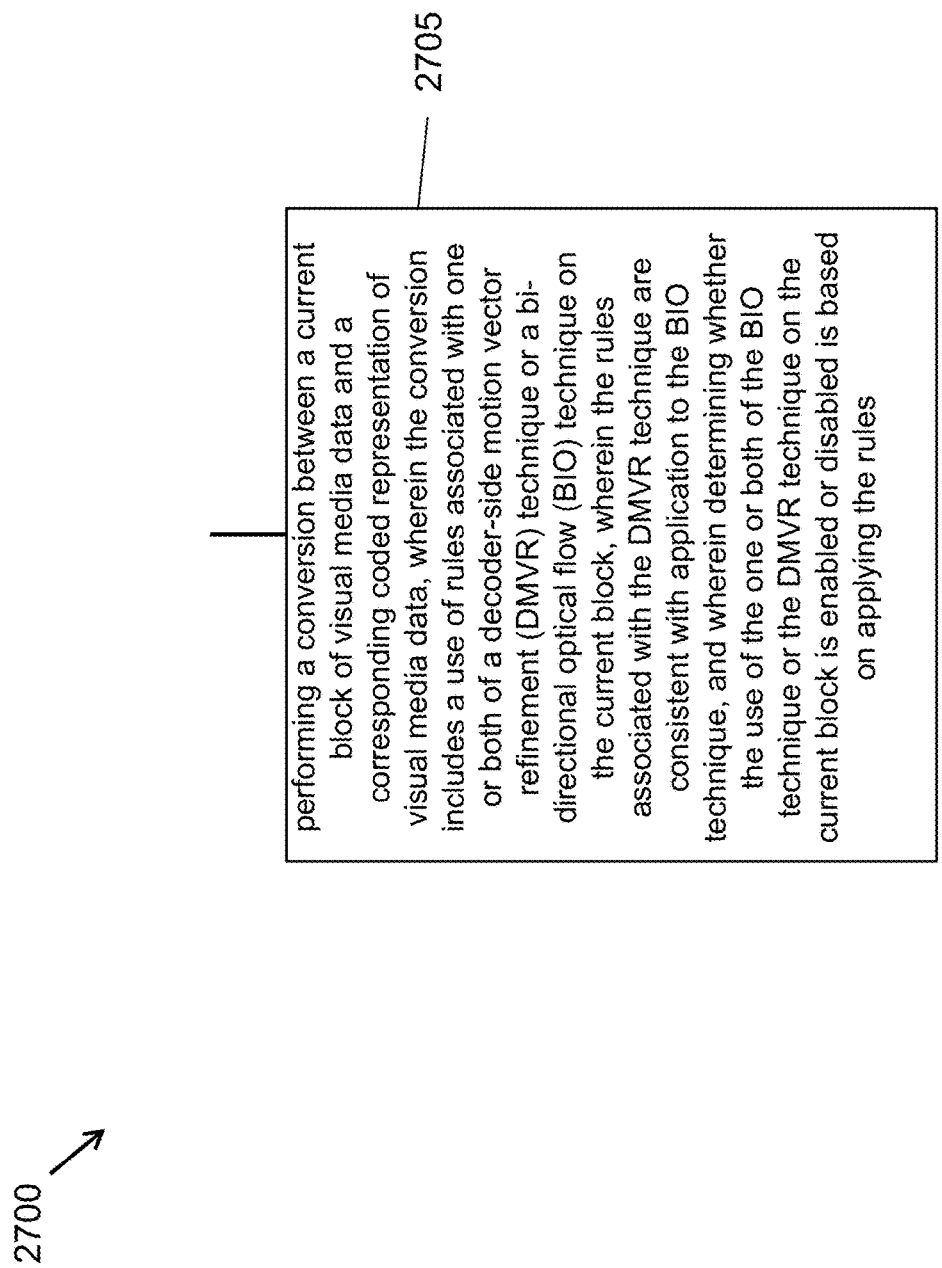
FIG. 27 is a flowchart for an example of a video processing method.

FIG. 27 is a flowchart for an example of a video processing method. Steps of this method are discussed in example 12 of Section 4 of this document. The method includes (at step 2705) performing a conversion between a current block of visual media data and a corresponding coded representation of visual media data, wherein the conversion includes a use of rules associated with one or both of a decoder-side motion vector refinement (DMVR) technique or a bi-directional optical flow (BIO) technique on the current block, wherein the rules associated with the DMVR technique are consistent with application to the BIO technique, and wherein determining whether the use of the one or both of the BIO technique or the DMVR technique on the current block is enabled or disabled is based on applying the rules.

Some embodiments of the present technology are discussed in clause-based format.

1. A method of visual media processing, comprising:
performing a conversion between a current block of visual media data and a corresponding coded representation of the visual media data,
wherein the conversion of the current block includes determining whether a use of one or both of a bi-directional optical flow (BIO) technique or a decoder-side motion vector refinement (DMVR) technique to the current block is enabled or disabled, and
wherein the determining the use of the BIO technique or the DMVR technique is based on a cost criterion associated with the current block.

2. The method of clause 1, wherein the cost criterion is based on one or more of: a sum of absolute transformed differences (SATD), a mean removed sum of absolute transformed differences (MRSATD), a sum of squares error (SSE), a mean removed sum of squares error (MRSSE), a mean value difference, or gradient values.

3. The method of any one or more of clauses 1-2, wherein the cost criterion is associated with a sub-block of the current block.

4. The method of clause 3, wherein a sub-block-level cost criterion is different from a block-level cost criterion.

5. The method of any one or more of clauses 1-4, further comprising:
upon determining that one or more of the gradient values, an average of the gradient values, or a range of the gradient values is outside a threshold range, disabling application of the BIO technique and/or the DMVR technique.

6. The method of clause 1, wherein the cost criterion associated with the current block is signaled in the coded representation.

7. The method of clause 6, wherein the cost criterion is signaled in a video parameter set (VPS), a sequence parameter set (SPS), a picture parameter set (PPS), a tile group header, or a slice header.

8. A method of visual media processing, comprising:
performing a conversion between a current block of visual media data and a corresponding coded representation of the visual media data,
wherein the conversion of the current block includes determining whether a use of a decoder-side motion vector refinement (DMVR) technique to the current block is enabled or disabled, and
wherein the DMVR technique includes refining motion information of the current block based on a cost criterion other than a mean removed sum of absolute differences (MRSAD) cost criterion.

9. The method of clause 8, wherein the cost criterion associated with the current block is based on one or more of: a sum of absolute transformed differences (SATD), a mean removed sum of absolute transformed differences (MRSATD), a sum of squares error (SSE), or a mean removed sum of squares error (MRSSE).

10. The method of any one or more of clauses 8-9, wherein the cost criterion is associated with a sub-block of the current block.

11. The method of clause 10, further comprising:
splitting the current block into multiple sub-blocks of size M×N, wherein the cost criterion is based on the motion information associated with each of the multiple sub-blocks; and
generating costs corresponding to each of the multiple sub-blocks.

12. The method of clause 11, further comprising:
summing at least a subset of the costs corresponding to each of the multiple sub-blocks to generate a resulting cost associated with the current block.

13. A method of visual media processing, comprising:
performing a conversion between a current block of visual media data and a corresponding coded representation of the visual media data,
wherein the conversion of the current block includes determining whether a use of one or both of a bi-directional optical flow (BIO) technique or a decoder-side motion vector refinement (DMVR) technique to the current block is enabled or disabled, and
wherein the determining the use of the BIO technique or the DMVR technique is based on computing that a mean value difference of a pair of reference blocks associated with the current block exceeds a threshold value.

14. The method of clause 13, wherein the threshold value is a first threshold value, further comprising:
upon determining that a mean value difference of a pair of reference sub-blocks associated with a sub-block of the current block exceeds a second threshold value, disabling application of the BIO technique and/or the DMVR technique.

15. The method of clause 14, wherein the first threshold value and/or the second threshold value are predefined numbers.

16. The method of clause 14, wherein the first threshold value and/or the second threshold value are based on dimensions of the current block.

17. A method of visual media processing, comprising:
modifying a first reference block to generate a first modified reference block, and a second reference block to generate a second modified reference block, wherein both the first reference block and the second reference block are associated with a current block of visual media data;
determining differences between the first modified reference block and the second modified reference block, the differences including one or more of: a sum of absolute transformed differences (SATD), a mean removed sum of absolute transformed differences (MRSATD), a sum of squares error (SSE), a mean removed sum of squares error (MRSSE), a mean value difference, or gradient values; and performing a conversion between the current block of visual media data and a corresponding coded representation of the visual media data, wherein the conversion includes a use of the differences between the first modified reference block and the second modified reference block generated from respectively modifying the first reference block and the second reference block.

18. The method of clause 17, wherein the modifying the first reference block and the second reference block includes:

computing a first arithmetic mean based on sample values included in the first reference block and a second arithmetic mean based on sample values included in the second reference block;

subtracting the first arithmetic mean from samples included in the first reference block and the second arithmetic mean from samples included in the second reference block.

19. The method of clause 18, wherein the first arithmetic mean and the second arithmetic mean are based on a subset of samples respectively included in the first reference block and the second reference block.

20. The method of any one or more of clauses 17-19, wherein the first reference block and/or the second reference block are sub-blocks associated with the current block.

21. A method of visual media processing, comprising:

determining a temporal gradient or a modified temporal gradient using reference pictures associated with a current block of visual media data, the temporal gradient or the modified temporal gradient indicative of differences between the reference pictures; and performing a conversion between the current block of visual media data and a corresponding coded representation of the visual media data, wherein the conversion includes a use of a bi-directional optical flow (BIO) technique based in part on the temporal gradient or the modified temporal gradient.

22. The method of clause 21, further comprising:

prematurely terminating the BIO technique, in response to determining that the temporal gradient or the modified temporal gradient is less than or equal to a threshold.

23. The method of clause 22, further comprising:

adjusting the threshold based on the number of samples used for calculating an absolute sum of the temporal gradient or the modified gradient.

24. The method of any one or more of clauses 21-23, wherein the differences are related to an absolute sum of the temporal gradient.'

25. The method of any one or more of clauses 21-24, wherein the differences between the reference pictures correspond to differences between a first portion of a first reference picture and a second portion of a second reference picture.

26. The method of any one or more of clauses 21-25, wherein the reference pictures are associated with a sub-block of the current block.

27. A method of visual media processing, comprising:

determining a first temporal gradient using reference pictures associated with a first video block or a sub-block thereof;

determining a second temporal gradient using reference pictures associated with a second video block or a sub-block thereof;

performing a modification of the first temporal gradient and a modification of the second temporal gradient to generate a modified first temporal gradient and a modified second temporal gradient, wherein the modification of the first temporal gradient associated with the first video block is different from the modification of the second temporal gradient associated with the second video block; and performing a conversion of the first video block and the second video block to their corresponding coded representation.

28. The method of clause 27, wherein the modification of the first temporal gradient and/or the modification of the second temporal gradient is conditionally based on an absolute mean difference between the reference pictures associated with the first video block and/or the second video block being greater than a threshold value.

29. The method of clause 28, wherein the threshold value is 4.

30. The method of clause 27, wherein the modification of the first temporal gradient and/or the modification of the second temporal gradient is conditionally based on an absolute mean difference between the reference pictures associated with the first video block and/or the second video block being less than a threshold value.

31. The method of clause 30, wherein the threshold value is 20.

32. The method of clause 27, wherein the modification of the first temporal gradient and/or the modification of the second temporal gradient is conditionally based on an absolute mean difference between the reference pictures associated with the first video block and/or the second video block being within a threshold range.

33. The method of any of clauses 27-32, further comprising:

disabling a use of a bi-directional optical flow (BIO) technique on the first video block and/or the second block based on an absolute mean difference between the reference pictures associated with the first video block and/or the second video block being greater than a threshold value.

34. The method of any one or more of clauses 27-33, wherein the threshold value or the threshold range is indicated in VPS, SPS, PPS, a picture, a slice, or a tile level associated with the first video block and/or the second video block.

35. The method of any one or more of clauses 27-33, wherein the threshold value or the threshold range are implicitly predefined parameters.

36. The method of any one or more of clauses 27-33, wherein the threshold value or the threshold range is different for different coding units (CUs), largest coding units (LCUs), slices, tiles, or pictures associated with the first video block and/or the second video block.

37. The method of any one or more of clauses 27-33, wherein the threshold value or the threshold range is based on a decoded or an encoded pixel value associated with the first video block and/or the second video block.

38. The method of any one or more of clauses 27-33, wherein the threshold value or the threshold range for a first set of reference pictures is different from the threshold value or the threshold range for a second set of reference pictures.

39. The method of clause 27, wherein the modification of the first temporal gradient and/or the modification of the second temporal gradient is conditionally based on an absolute mean of the reference pictures associated with the first video block and/or the second video block being greater than a threshold value.

40. The method of clause 39, wherein the threshold value is 40.

41. The method of clause 27, wherein the modification of the first temporal gradient and/or the modification of the second temporal gradient is conditionally based on an absolute mean of the reference pictures associated with the first video block and/or the second video block being smaller than a threshold value.

42. The method of clause 41, wherein the threshold value is 100.

43. The method of clause 27, wherein the modification of the first temporal gradient and/or the modification of the second temporal gradient is conditionally based on an absolute mean of the reference pictures associated with the first video block and/or the second video block being within a threshold range.

44. The method of clause 27, wherein the modification of the first temporal gradient and/or the modification of the second temporal gradient is conditionally based on an absolute mean of the reference pictures associated with the first video block and/or the second video block being greater than an absolute mean difference of the reference pictures associated with the first video block and/or the second video block times a multiplication factor.

45. The method of clause 27, wherein the modification of the first temporal gradient and/or the modification of the second temporal gradient is conditionally based on an absolute mean of the reference pictures associated with the first video block and/or the second video block being less than an absolute mean difference of the reference pictures associated with the first video block and/or the second video block times a multiplication factor.

46. The method of any one or more of clauses 44-45, wherein the multiplication factor is 4.5.

47. A method of visual media processing, comprising:

modifying one or both of a first inter reference block and a second inter reference block associated with a current block;

determining, based on using the one or both modified first inter reference block and/or the modified second inter reference block, a spatial gradient associated with the current block in accordance with applying a bi-directional optical (BIO) flow technique; and performing a conversion between the current block and a corresponding coded representation, wherein the conversion includes a use of the spatial gradient associated with the current block.

48. The method of clause 47, wherein determining the spatial gradient includes:

generating two prediction blocks based on a weighted averaging of an intra prediction block and an inter prediction block associated with the current block; and using the two prediction blocks for determining the spatial gradient associated with the current block.

49. The method of clause 48, further comprising:

generating, using the BIO technique, a refined prediction block from the two prediction blocks; and using the refined prediction block for predicting sub-blocks and/or samples of the current block.

50. A method of visual media processing, comprising:

performing a determination, by a processor, that a flag signaled at a block level indicates, at least in part, that one or both of a decoder-side motion vector refinement (DMVR) technique or a bi-directional optical flow (BIO) technique is to be enabled for a current block; and performing a conversion between the current block and a corresponding coded representation, wherein the coded representation includes the flag indicating whether the one or both of the DMVR technique and/or the BIO technique is enabled.

51. The method of clause 50, wherein the flag is signaled in the coded representation in response to detecting that an advanced motion vector prediction (AMVP) technique is enabled for the current block.

52. The method of clause 50, wherein the flag is derived from one or both of spatial neighboring blocks or temporal neighboring blocks associated with the current block in response to detecting that a merge mode is enabled for the current block.

53. The method of clause 52, wherein, the flag is inherited from a selected merging candidate if the selected merging candidate is a spatial merging candidate.

54. The method of clause 52, wherein, the flag is inherited from a selected merging candidate if the selected merging candidate is a temporal merging candidate.

55. The method of clause 50, wherein, a cost criterion associated with the current block is used to determine whether the one or both of the DMVR technique and/or the BIO technique is enabled, and the flag signaled in the coded representation is used to indicate whether such determination is correct or not.

56. The method of clause 55, wherein the cost criterion associated with the current block is a sum of absolute difference (SAD) between two reference blocks of the current block, and wherein the determination that the one or both of the DMVR technique and/or the BIO technique is enabled applies when the cost criterion is greater than a threshold.

57. The method of clause 50, further comprising:

upon determining that the current block is a uni-predicted block, skipping signaling of the flag in the coded representation.

58. The method of clause 50, further comprising:

upon determining that the current block is a bi-predicted block associated with a pair of reference pictures both of which are either preceding or succeeding in a display order, skipping signaling of the flag in the coded representation.

59. The method of clause 50, further comprising:

upon determining that the current block is a bi-predicted block associated with a pair of reference pictures with different picture order count (POC) distances from a current picture associated with the current block, skipping signaling of the flag in the coded representation.

60. The method of clause 50, further comprising:

upon determining that the current block is an intra coded block, skipping signaling of the flag in the coded representation.

61. The method of clause 50, further comprising:

upon determining that the current block is a hybrid intra and inter predicted block, skipping signaling of the flag in the coded representation.

62. The method of clause 50, further comprising:

upon determining that the current block is associated with at least one block of a picture same as a reference block, skipping signaling of the flag in the coded representation.

63. The method of clause 50, further comprising:

upon determining that a dimension of the current block is smaller than a threshold value, skipping signaling of the flag in the coded representation.

64. The method of clause 50, further comprising:

upon determining that a dimension of the current block is greater than or equal to a threshold value, skipping signaling of the flag in the coded representation.

65. The method of clause 50, further comprising:
upon determining that a precision of motion information associated with the current block is an integer precision, skipping signaling of the flag in the coded representation.

66. The method of clause 50, further comprising:
upon determining that a temporal layer associated with the picture containing the current block is beyond a threshold value, skipping signaling of the flag in the coded representation.

67. The method of clause 50, further comprising:
upon determining that a quantization parameter associated with the current block is beyond a threshold value, skipping signaling of the flag in the coded representation.

68. The method of any one or more of clauses 50-67, further comprising:
in response to determining that signaling of the flag in the coded representation is skipped, deriving a value of the flag as a Boolean true or false.

69. The method of any one or more of clauses 50-67, further comprising:
upon determining that the flag is a Boolean true, enabling the one or both of the DMVR technique or the BIO technique.

70. The method of any one or more of clauses 50-67, further comprising:
upon determining that the flag is a Boolean false, disabling the one or both of the DMVR technique or the BIO technique.

71. The method of any one or more of clauses 50-67, further comprising:
upon determining that the flag is a Boolean true, the determination of the enabling or disabling one or both of the DMVR technique or the BIO technique based on at least one cost criterion is determined as correct.

72. The method of any one or more of clauses 50-67, further comprising:
upon determining that the flag is a Boolean false, the determination of the enabling or disabling one or both of the DMVR technique or the BIO technique based on at least one cost criterion is determined as incorrect.

73. The method of any one or more of clause 50-67, wherein the flag is signaled in a slice header, a tile header, a Video Parameter Set (VPS), a Sequence Parameter Set (SPS), or a Picture Parameter Set (PPS).

74. The method of clause 50, wherein a first flag is signaled to indicate whether the DMVR technique is disabled or not, and a second flag is signaled to indicate whether the BIO technique is disabled or not.

75. The method of any one or more of clauses 64-74, further comprising:
upon determining that the flag for the DMVR technique is a Boolean true, disabling the DMVR technique for a slice, a tile, a video, a sequence or a picture.

76. The method of any one or more of clauses 64-74, further comprising:
upon determining that the flag for the DMVR technique is a Boolean false, enabling the DMVR technique for a slice, a tile, a video, a sequence or a picture.

77. The method of any one or more of clauses 64-74, further comprising:
upon determining that the flag for the BIO technique is a Boolean true, disabling the BIO technique for a slice, a tile, a video, a sequence or a picture.

78. The method of any one or more of clauses 64-74, further comprising:
upon determining that the flag for the BIO technique is a Boolean false, enabling the BIO technique for a slice, a tile, a video, a sequence or a picture.

79. A method of visual media processing, comprising:
performing a determination, by a processor that a decoder-side motion vector refinement (DMVR) technique is to be enabled for a current block, wherein the determination is based exclusively on a height of the current block; and
performing a conversion between the current block and a corresponding coded representation.

80. The method of clause 79, further comprising:
in response to determining that the DMVR technique is enabled, verifying that the height of the current block is greater than or exceeds a threshold parameter.

81. The method of clause 80, wherein the threshold parameter equals 4.

82. The method of clause 80, wherein the threshold parameter equals 8.

83. A method of visual media processing, comprising:
performing a conversion between a current block of visual media data and a corresponding coded representation of visual media data, wherein the conversion includes a use of rules associated with one or both of a decoder-side motion vector refinement (DMVR) technique or a bi-directional optical flow (BIO) technique on the current block, wherein the rules associated with the DMVR technique are consistent with application to the BIO technique; and
wherein determining whether the use of the one or both of the BIO technique or the DMVR technique on the current block is enabled or disabled is based on applying the rules.

84. The method of clause 83, wherein a rule to determine whether the DMVR technique is enabled is same as a rule to determine whether the BIO technique is enabled.

85. The method of clause 84, wherein the rule to determine whether the BIO technique and/or the DMVR technique is enabled specifies verifying that a height of the current block is greater than or equal to a threshold value.

86. The method of clause 84, wherein the rule to determine whether the BIO technique and/or the DMVR technique is enabled specifies verifying that both of a width and a height of the current block are greater than or equal to a threshold value.

87. The method of any one or more of clauses 85 or 86, wherein the threshold value is 4 or 8.

88. The method of clause 84, wherein the rule to determine whether the BIO technique and/or the DMVR technique is enabled specifies verifying that a size of the current block is greater than or equal to a threshold value.

89. The method of clause 86, wherein the threshold value is 64 or 128.

90. The method of clause 84, wherein the rule to determine whether the BIO technique and/or the DMVR technique is enabled specifies verifying that the current block is not coded in a Bi-prediction with CU-level Weight (BCW) mode, wherein unequal weights are used for two reference blocks from two reference lists.

91. The method of clause 84, wherein the rule to determine whether the BIO technique and/or the DMVR technique is enabled specifies verifying that the current block is a bi-predicted block associated with a pair of reference pictures with a same picture order count (POC) distance from a current picture associated with the current block.

92. The method of clause 91, wherein the pair of reference pictures include a preceding picture and a succeeding picture of the current picture associated with the current block, in display order.

93. A video decoding apparatus comprising a processor configured to implement a method recited in one or more of clauses 1 to 92.

94. A video encoding apparatus comprising a processor configured to implement a method recited in one or more of clauses 1 to 92.

95. A computer program product having computer code stored thereon, the code, when executed by a processor, causes the processor to implement a method recited in any of clauses 1 to 92.

96. A method, apparatus or system described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   determining, for a current block of a video, an initial prediction sample;
   refining the initial prediction sample, based on an optical flow refinement technology, with a prediction sample offset to acquire a final prediction sample; and
   performing a conversion between the current block and a bitstream of the video based on the final prediction sample,
   wherein the prediction sample offset is determined based on at least one spatial gradient of the initial prediction sample, wherein the spatial gradient is calculated based on at least a difference between two first prediction samples from a same reference picture list, and
   wherein before calculating the difference between the two first prediction samples, values of the two first prediction sample are right shifted with a first value.

2. The method of claim 1, wherein for a sample location (x,y) in the current block, the two first prediction samples have locations (hx+1, vy) and (hx−1, vy) corresponding to the same reference picture list X or locations (hx, vy+1) and (hx, vy−1) corresponding to the same reference picture list X, and wherein X=0 or 1, hx=Clip3(1, nCbW, x) and vy=Clip3(1, nCbH, y), nCbW and nCbH is a width and a height of the current block, and wherein Clip3 is a clipping function which is defined as:

$$\text{Clip3}(u, v, w) = \begin{cases} u & ; \quad w < u \\ v & ; \quad w > v \\ w & ; \quad \text{otherwise} \end{cases}.$$

3. The method of claim 1, wherein the prediction sample offset is determined further based on at least one temporal gradient, wherein the temporal gradient is calculated based on at least a difference between two second prediction samples from different reference picture lists, and wherein before calculating the difference between the two second prediction samples, values of the two second prediction sample are right shifted with a second value.

4. The method of claim 3, wherein for a sample location (x,y) in the current block, the two second prediction samples have locations (hx, vy) corresponding to a reference picture list 0 and a reference picture list 1, and wherein hx=Clip3(1, nCbW, x) and vy=Clip3(1, nCbH, y), nCbW and nCbH is a width and a height of the current block, and wherein Clip3 is a clipping function which is defined as:

$$\text{Clip3}(u, v, w) = \begin{cases} u & ; \quad w < u \\ v & ; \quad w > v \\ w & ; \quad \text{otherwise} \end{cases}.$$

5. The method of claim 3, wherein the first value is different from the second value.

6. The method of claim 1, wherein the prediction sample offset is determined further based on at least one temporal gradient, wherein the temporal gradient is calculated based on at least a difference between two second prediction samples from different reference picture list, and wherein a shifting rule of the difference between the two second prediction samples is same as that of the difference between the two first prediction samples, and the shifting rule includes an order of a right-shifting operation and a subtraction operation.

7. The method of claim 1, wherein whether the optical flow refinement procedure is enabled based on a condition related with a size of the current block.

8. The method of claim 7, wherein whether a decoder-side motion vector refinement technique is enabled for the current block is based on the same condition, wherein the decoder-side motion vector refinement technique is used to derive a refined motion information of the current block based on a cost between at least one prediction sample acquired based on at least one reference sample of reference picture list 0 and at least one prediction sample acquired based on at least one reference sample of reference picture list 1.

9. The method of claim 8, wherein the optical flow refinement technology and the decoder-side motion vector refinement technique are enabled at least based on a height of the current block is equal to or greater than T1.

10. The method of claim 9, wherein T1=8.

11. The method of claim 1, wherein performing the conversion includes decoding the current block from the bitstream.

12. The method of claim 1, wherein performing the conversion includes encoding the current block into the bitstream.

13. An apparatus for processing video data comprising a processor and a non-transitory memory with instructions thereon, wherein the instructions upon execution by the processor, cause the processor to:

determine, for a current block of a video, an initial prediction sample;

refine the initial prediction sample, based on an optical flow refinement technology, with a prediction sample offset to acquire a final prediction sample; and perform a conversion between the current block and a bitstream of the video based on the final prediction sample, wherein the prediction sample offset is determined based on at least one spatial gradient of the initial prediction sample, wherein the spatial gradient is calculated based on at least a difference between two first prediction samples from a same reference picture list, and wherein before calculating the difference between the two first prediction samples, values of the two first prediction sample are right shifted with a first value.

14. The apparatus of claim 13, wherein for a sample location (x,y) in the current block, the two first prediction samples have locations (hx+1, vy) and (hx−1, vy) corresponding to the same reference picture list X or locations (hx, vy+1) and (hx, vy−1) corresponding to the same reference picture list X, and wherein X=0 or 1, hx=Clip3(1, nCbW, x) and vy=Clip3(1, nCbH, y), nCbW and nCbH is a width and a height of the current block, and wherein Clip3 is a clipping function which is defined as:

$$\text{Clip3}(u, v, w) = \begin{cases} u & ; \quad w < u \\ v & ; \quad w > v \\ w & ; \quad \text{otherwise} \end{cases}.$$

15. The apparatus of claim 13, wherein the prediction sample offset is determined further based on at least one temporal gradient, wherein the temporal gradient is calculated based on at least a difference between two second prediction samples from different reference picture lists, and wherein before calculating the difference between the two second prediction samples, values of the two second prediction sample are right shifted with a second value.

16. The apparatus of claim 15, wherein for a sample location (x,y) in the current block, the two second prediction samples have locations (hx, vy) corresponding to a reference list picture 0 and a reference picture list 1, and wherein hx=Clip3(1, nCbW, x) and vy=Clip3(1, nCbH, y), nCbW and nCbH is a width and a height of the current block, and wherein Clip3 is a clipping function which is defined as:

$$\text{Clip3}(u, v, w) = \begin{cases} u & ; \quad w < u \\ v & ; \quad w > v \\ w & ; \quad \text{otherwise} \end{cases}.$$

17. The apparatus of claim 15, wherein the first value is different from the second value.

18. A non-transitory computer-readable storage medium storing instructions that cause a processor to:
   determine, for a current block of a video, an initial prediction sample;
   refine the initial prediction sample, based on an optical flow refinement technology, with a prediction sample offset to acquire a final prediction sample; and
   perform a conversion between the current block and a bitstream of the video based on the final prediction sample,
   wherein the prediction sample offset is determined based on at least one spatial gradient of the initial prediction sample, wherein the spatial gradient is calculated based on at least a difference between two first prediction samples from a same reference picture list, and
   wherein before calculating the difference between the two first prediction samples, values of the two first prediction sample are right shifted with a first value.

19. The non-transitory computer-readable storage medium of claim 18, wherein for a sample location (x,y) in the current block, the two first prediction samples have locations (hx+1, vy) and (hx−1, vy) corresponding to the same reference picture list X or locations (hx, vy+1) and (hx, vy−1) corresponding to the same reference picture list X, and
   wherein X=0 or 1, hx=Clip3(1, nCbW, x) and vy=Clip3(1, nCbH, y), nCbW and nCbH is a width and a height of the current block, and wherein Clip3 is a clipping function which is defined as:

$$\text{Clip3}(u, v, w) = \begin{cases} u & ; \quad w < u \\ v & ; \quad w > v \\ w & ; \quad \text{otherwise} \end{cases}.$$

20. A non-transitory computer-readable recording medium storing a bitstream of a video which is generated by a method performed by a video processing apparatus, wherein the method comprises:
   determining, for a current block of a video, an initial prediction sample;
   refining the initial prediction sample, based on an optical flow refinement technology, with a prediction sample offset to acquire a final prediction sample; and
   generating the bitstream based on the final prediction sample,
   wherein the prediction sample offset is determined based on at least one spatial gradient of the initial prediction sample, wherein the spatial gradient is calculated based on at least a difference between two first prediction samples from a same reference picture list, and
   wherein before calculating the difference between the two first prediction samples, values of the two first prediction sample are right shifted with a first value.

* * * * *